(12) United States Patent
Thanner et al.

(10) Patent No.: US 10,807,227 B2
(45) Date of Patent: Oct. 20, 2020

(54) SELF-LOCKING LATCH OF AN ADAPTER APPARATUS

(71) Applicant: HILTI AKTIENGESELLSCHAFT, Schaan (LI)

(72) Inventors: Thomas Thanner, Munich (DE); Rene Richter, Augsburg (DE); Johannes Stempfhuber, Utting am Ammersee (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 663 days.

(21) Appl. No.: 15/520,262

(22) PCT Filed: Nov. 27, 2015

(86) PCT No.: PCT/EP2015/077867
§ 371 (c)(1),
(2) Date: Apr. 19, 2017

(87) PCT Pub. No.: WO2016/083555
PCT Pub. Date: Jun. 2, 2016

(65) Prior Publication Data
US 2017/0312903 A1 Nov. 2, 2017

(30) Foreign Application Priority Data
Nov. 27, 2014 (EP) .................................. 14195068

(51) Int. Cl.
*B25F 5/02* (2006.01)
*H01M 2/10* (2006.01)
*H01R 31/06* (2006.01)

(52) U.S. Cl.
CPC ............. *B25F 5/02* (2013.01); *H01M 2/1033* (2013.01); *H01R 31/06* (2013.01); *Y10T 403/598* (2015.01)

(58) Field of Classification Search
CPC ........... B25F 5/00; B25F 5/02; H01M 2/1016; H01M 2/1022; H01M 2/1027;
(Continued)

(56) References Cited

U.S. PATENT DOCUMENTS 7,293,934 B1 * 11/2007 Huang .................... F16B 7/105
403/325
9,066,616 B2 * 6/2015 Yap ..................... A45C 13/1092
(Continued)

FOREIGN PATENT DOCUMENTS

CN 201197081 Y 2/2009
CN 201227812 Y 4/2009
(Continued)

OTHER PUBLICATIONS

European Patent Office, European Search Report in European Application No. EP 14 19 5068, dated May 13, 2015.
(Continued)

*Primary Examiner* — Josh Skroupa
(74) *Attorney, Agent, or Firm* — Leydig Voit & Mayer, Ltd.

(57) ABSTRACT

An adapter apparatus for connecting a rechargeable battery to a power tool, containing a latching device for latching the adapter apparatus together with the power tool; and a locking device for locking the latching device is disclosed. The latching device is adjustable reversibly from a first position into a second position, wherein, in the first position, the adapter apparatus is firmly connected to the power tool and, in the second position, the adapter apparatus is detachable from the power tool, and the locking device is adjustable reversibly from a first position into a second position, wherein, in the first position, the locking device locks the latching device in the first position and, in the second position, the locking device does not lock the latching device
(Continued)

Figure 1:
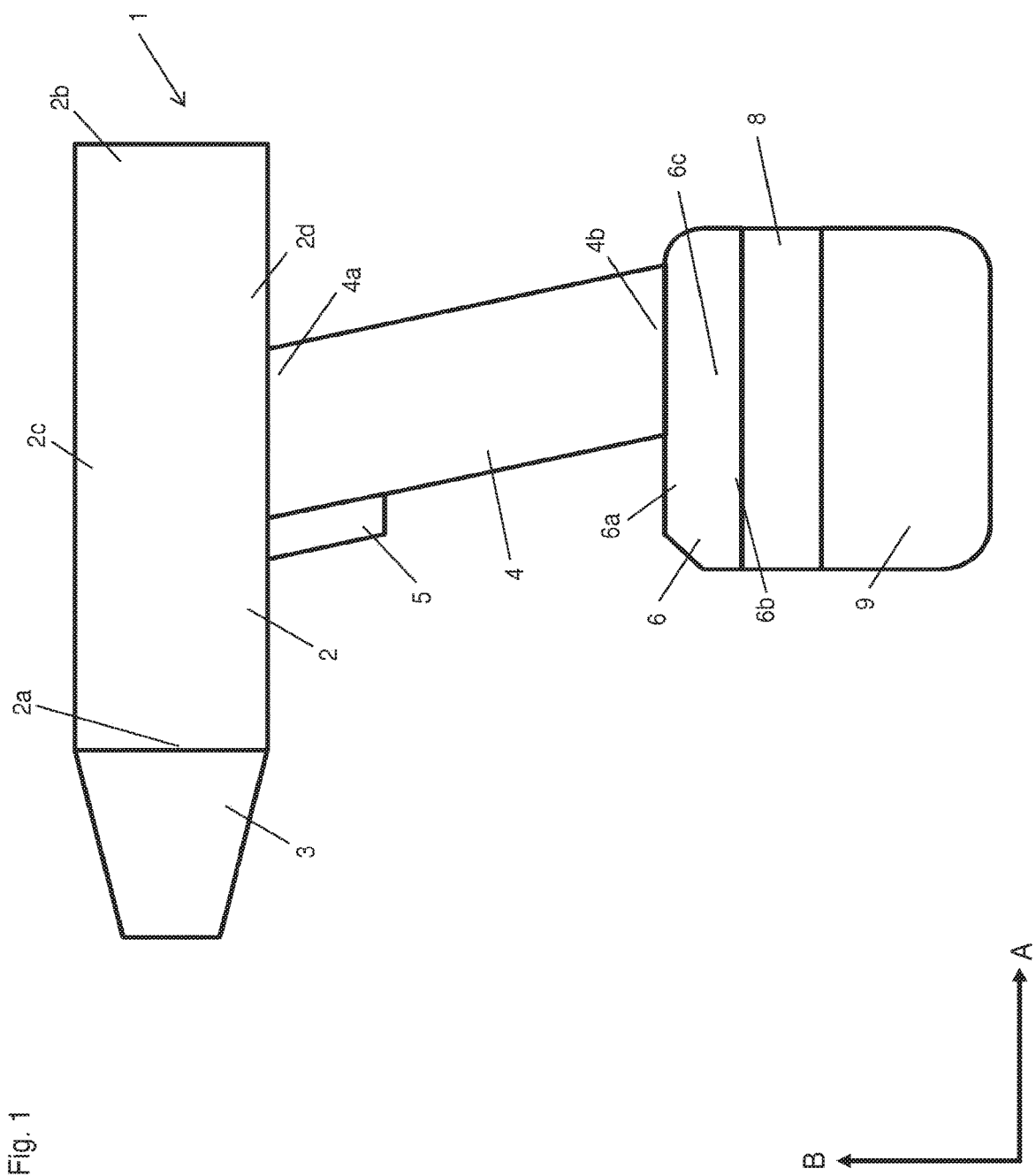

and so the latching device is movable from the first position into the second position.

13 Claims, 26 Drawing Sheets

(58) Field of Classification Search
CPC .... H01M 2/1033; H01R 31/06; H02J 7/0042; H02J 7/045; Y10T 403/587; Y10T 403/591; Y10T 403/598; Y10T 403/60; Y10T 403/602; Y10T 403/606; Y10T 403/608; Y10T 403/70015; Y10T 403/7015
USPC .... 403/319, 322.1, 325, 326, 327, 329, 330, 403/353, DIG. 4
See application file for complete search history.

(56) References Cited

U.S. PATENT DOCUMENTS 9,160,125 B2 * 10/2015 Ota ................... H01R 31/06
9,206,582 B2 * 12/2015 Doherty ............... E02F 3/3618
2008/0122404 A1   5/2008  Brotto
2008/0311795 A1  12/2008  Brotto et al.
2011/0012564 A1   1/2011  Yang et al.
2011/0198103 A1   8/2011  Suzuki
2015/0165614 A1   6/2015  Frenken et al.

FOREIGN PATENT DOCUMENTS

| CN | 201565924 U | 9/2010 | |
| CN | 202702206 U | 1/2013 | |
| DE | 10 2012 104 538 A1 | 11/2013 | |
| EP | 1 833 137 A2 | 9/2007 | |
| EP | 1 903 657 A2 | 3/2008 | |
| EP | 2555340 A1 * | 2/2013 | ......... H01R 13/6397 |
| FR | 2 884 446 A3 | 10/2006 | |
| GB | 2 433 350 A | 6/2007 | |

OTHER PUBLICATIONS

International Bureau, International Search Report in International Application No. PCT/EP2015/077867, dated Mar. 11, 2016.

* cited by examiner

SELF-LOCKING LATCH OF AN ADAPTER APPARATUS

CROSS-REFERENCE TO RELATED APPLICATIONS

This patent application is the U.S. National Stage of International Patent Application No. PCT/EP2015/077867, filed Nov. 27, 2015, which claims the benefit of European Patent Application No. 14195068.3, filed Nov. 27, 2014, which are each incorporated by reference.

BACKGROUND OF THE INVENTION

The present invention relates to an adapter apparatus for connecting a rechargeable battery to a power tool, containing a latching device for latching the adapter apparatus to the power tool and a locking device for locking the latching device.

Normally, power tools are not connected directly to the respective rechargeable battery. An adapter apparatus is often positioned between the power tool and the rechargeable battery. This adapter apparatus serves to connect different types of power tools to different types of rechargeable batteries. In other words: the adapter apparatus establishes compatibility between the various interfaces of the power tools and rechargeable batteries so that the greatest possible variety of combinations can be created between the individual power tools and rechargeable batteries.

In the prior art, adapter apparatuses are disclosed inter alia in German patent application DE 10 2012 104 538. In this context, DE 10 2012 104 538 discloses a tool that is driven hydraulically or by an electric motor, such as a pressing device, with a device shaft that has at least one first and one second electric contact and with a rechargeable battery that can be snap-locked to the device shaft, wherein an adapter, which can be secured to the device shaft by means of a snap-lock connection with said device shaft, is provided between the device shaft and the rechargeable battery. To connect an adapter to a device shaft of this kind of device in an advantageous way, the snap-lock connection with the device shaft can be released only by actuating a release mechanism within the adapter. Actuation or raising is possible only with a suitable tool, such as a screwdriver.

Moreover, adapter apparatuses are often configured so that they can easily and quickly be removed from the power tool. Rechargeable batteries are likewise often configured so that they can easily and quickly be removed from the power tool and especially from the adapter apparatus. To this end, both the adapter apparatus and the rechargeable batteries are normally equipped with a sliding mechanism, with which the respective adapter apparatus and rechargeable battery can be removed by being pulled off or down.

A problem arises in the unintended removal of the adapter apparatus from the power tool along with the rechargeable battery when only the rechargeable battery is supposed to be removed, i.e. pulled off, from the power tool or adapter apparatus.

The problem addressed by the present invention is therefore that of providing an adapter apparatus for connecting a rechargeable battery to a power tool which still permits the simple and quick removal of the power tool but also prevents the unintended removal of the adapter apparatus from the power tool when only the rechargeable battery is supposed to be removed from the power tool or from the adapter apparatus.

This problem is solved according to the invention by the subject matter of independent claim 1. Further embodiments of the claimed subject matter can be found in the dependent sub-claims.

BRIEF SUMMARY OF THE INVENTION

An adapter apparatus is provided to connect a rechargeable battery to a power tool, said apparatus having a latching device for latching the adapter apparatus to the power tool and a locking device for locking the latching device.

The invention provides that the latching device can be reversibly adjusted from a first position to a second position, wherein, in the first position, the adapter apparatus is firmly attached to the power tool and, in the second position, the adapter apparatus can be removed from the power tool, and that the locking device can be reversibly adjusted from a first position to a second position, wherein, in the first position, the locking device locks the latching device in its first position and, in the second position, the locking device does not lock the latching device so that the latching device can be moved from the first position to the second position. In this way, it becomes possible to remove the adapter apparatus from the power tool in a simple and quick way while also preventing an unintended removal of the adapter apparatus from the power tool when only the rechargeable battery is supposed to be removed from the power tool or from the adapter apparatus.

According to a further advantageous embodiment of the present invention, it can be possible for the locking device to be moved from the second position to the first position by connecting the rechargeable battery to the adapter apparatus. In this way, the locking device can be brought into the first position and the latching device can be locked in the first position simply by attaching a rechargeable battery.

According to a further advantageous embodiment of the present invention, a compression spring element can be provided on the adapter apparatus, whereby the spring force of the compression spring element creates an interval between the latching device and the locking device when no battery is connected to the adapter apparatus, wherein the latching device contains at least one first latching element and the interval corresponds at least to the height of said latching element. This gives the latching device space so that it can be moved from the first position to the second position.

In order to prevent the latching device from shifting from the first position to the second position when no battery is connected to the adapter apparatus, a further advantageous embodiment of the present invention provides that the latching device can be retained in the first position by the spring force of the compression spring element.

According to a further advantageous embodiment of the present invention, it can be possible that the latching device is configured such that the latching device shifts from the first position to the second position against the spring force of the compression spring element when the adapter apparatus is moved relative to the power tool. In this way, the adapter apparatus can be removed from the power tool easily and quickly and without the use of a tool.

To provide an embodiment that is as simple and robust as possible and that can also be used without the aid of a tool, it is possible in a further advantageous embodiment of the present invention for the latching device to be configured in the form of a snap-fit connection.

BRIEF DESCRIPTION OF THE SEVERAL VIEWS OF THE DRAWING(S)

Further advantages arise from the description of the drawings below. Various embodiments of the present invention are shown in the drawings. The drawings, description and claims contain numerous features in combination. A person skilled in the art will also consider the features individually as is practical and combine them into further useful combinations.

Components that are identical or similar are numbered with the same reference signs in drawings.

Figure 2:
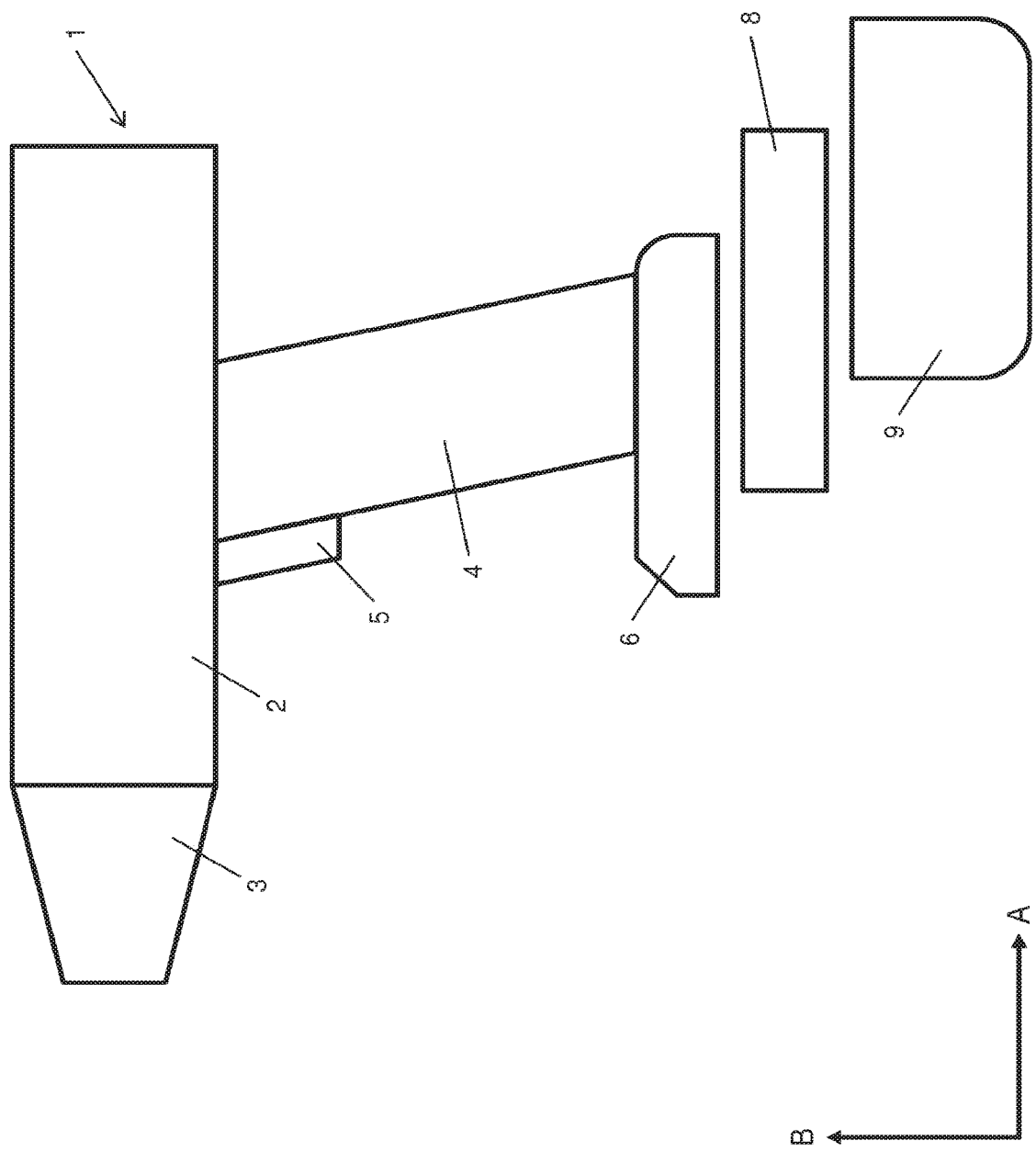
Figure 3:
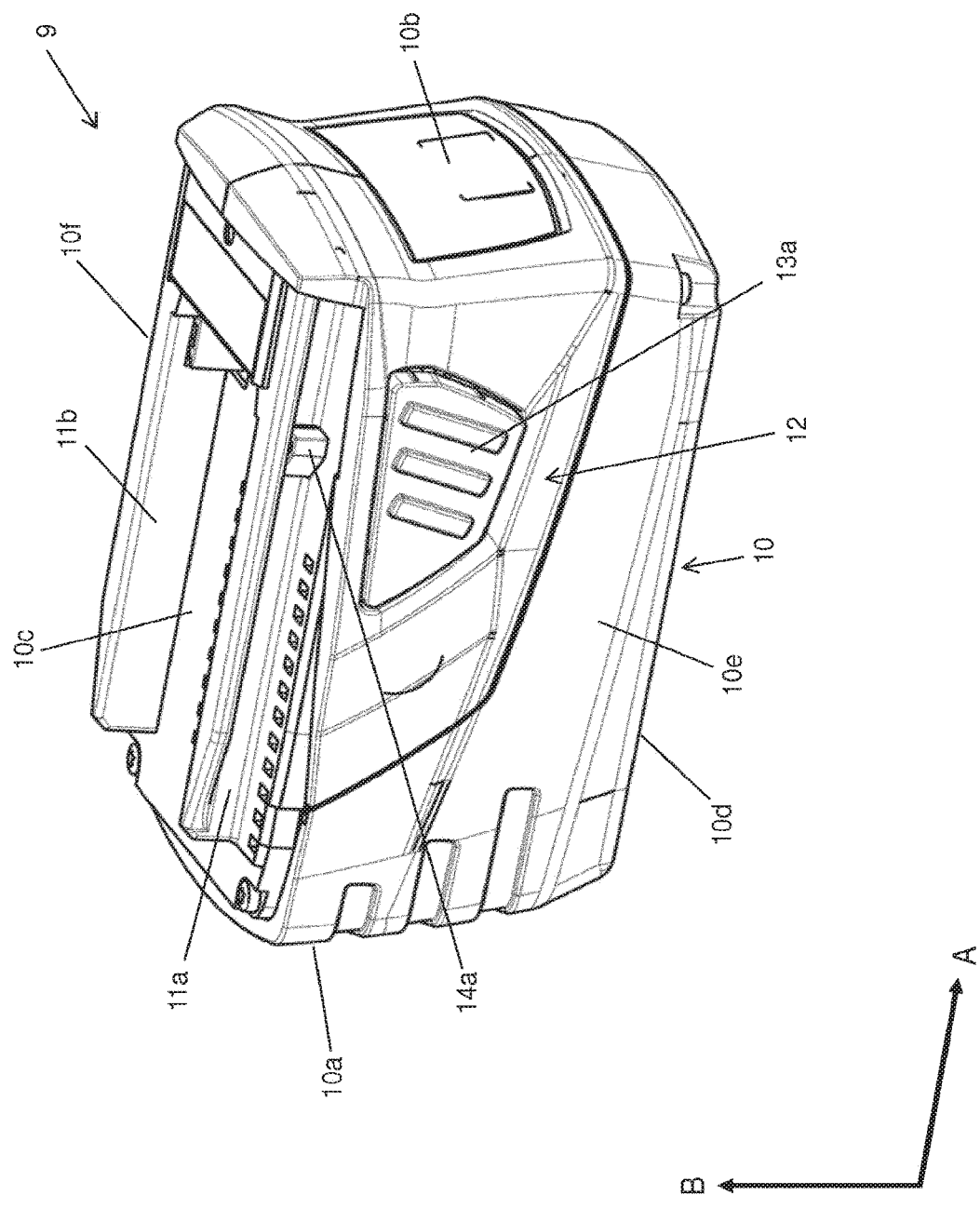
Figure 4:
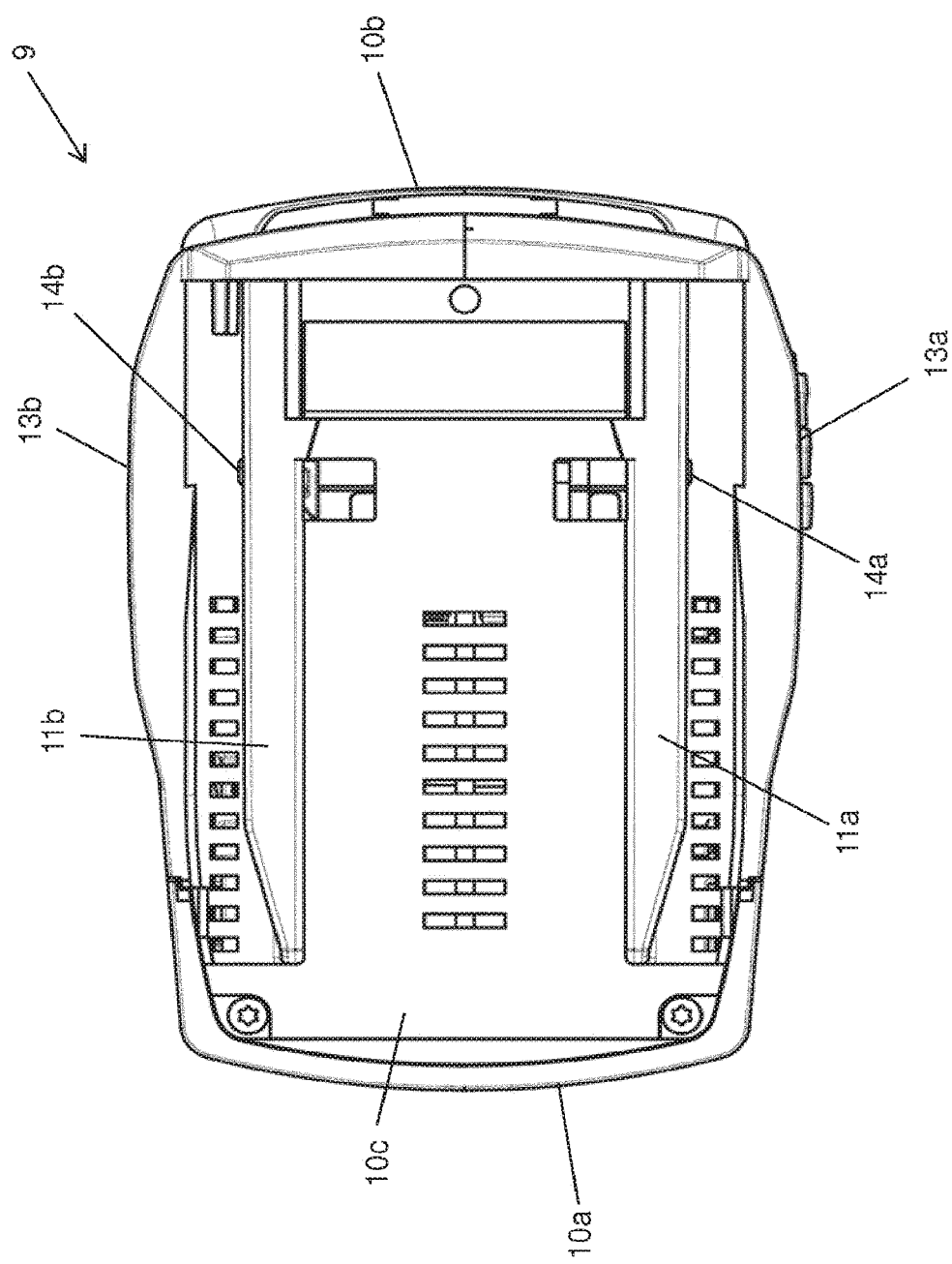
Figure 5:
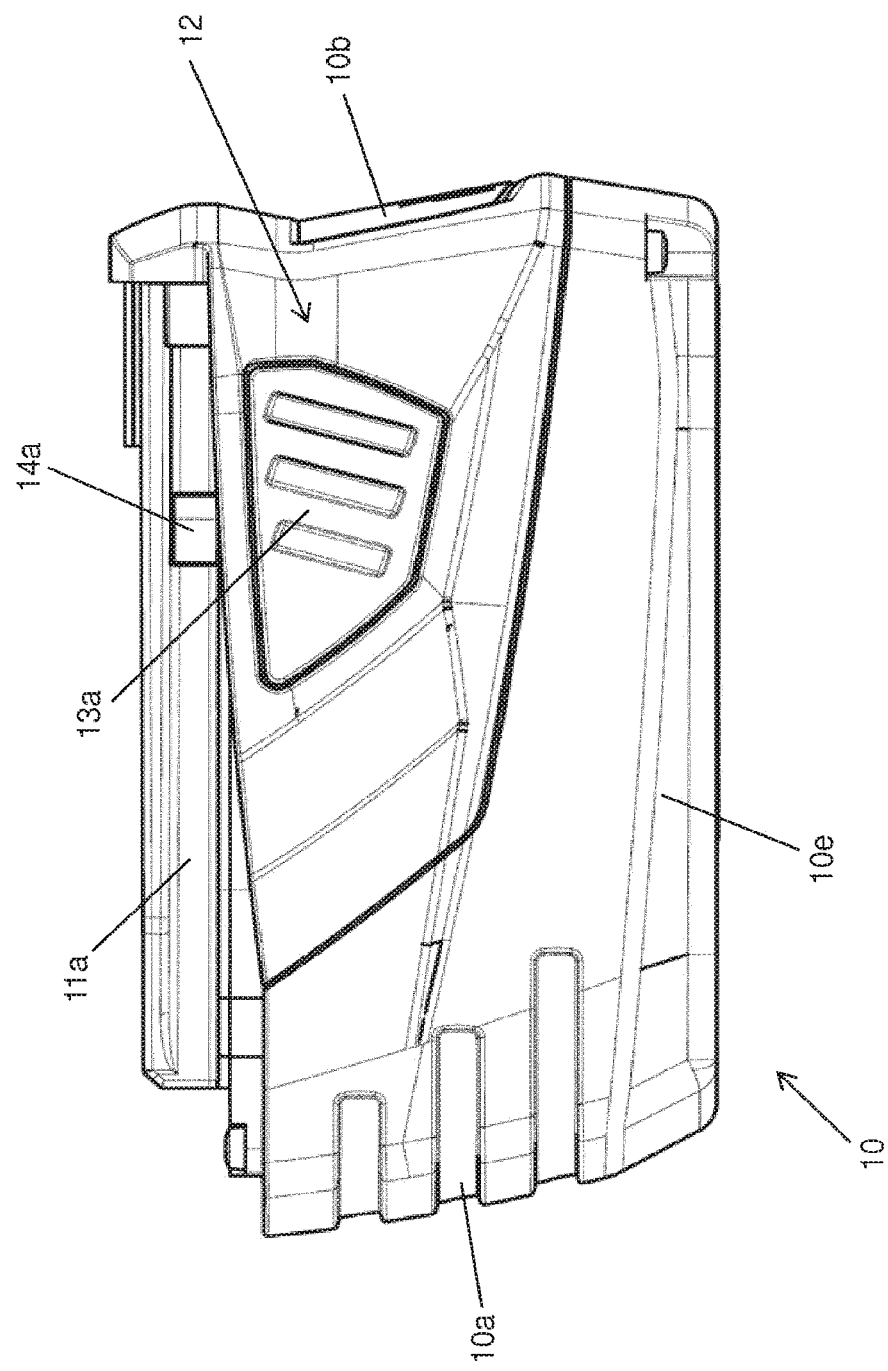
Figure 6:
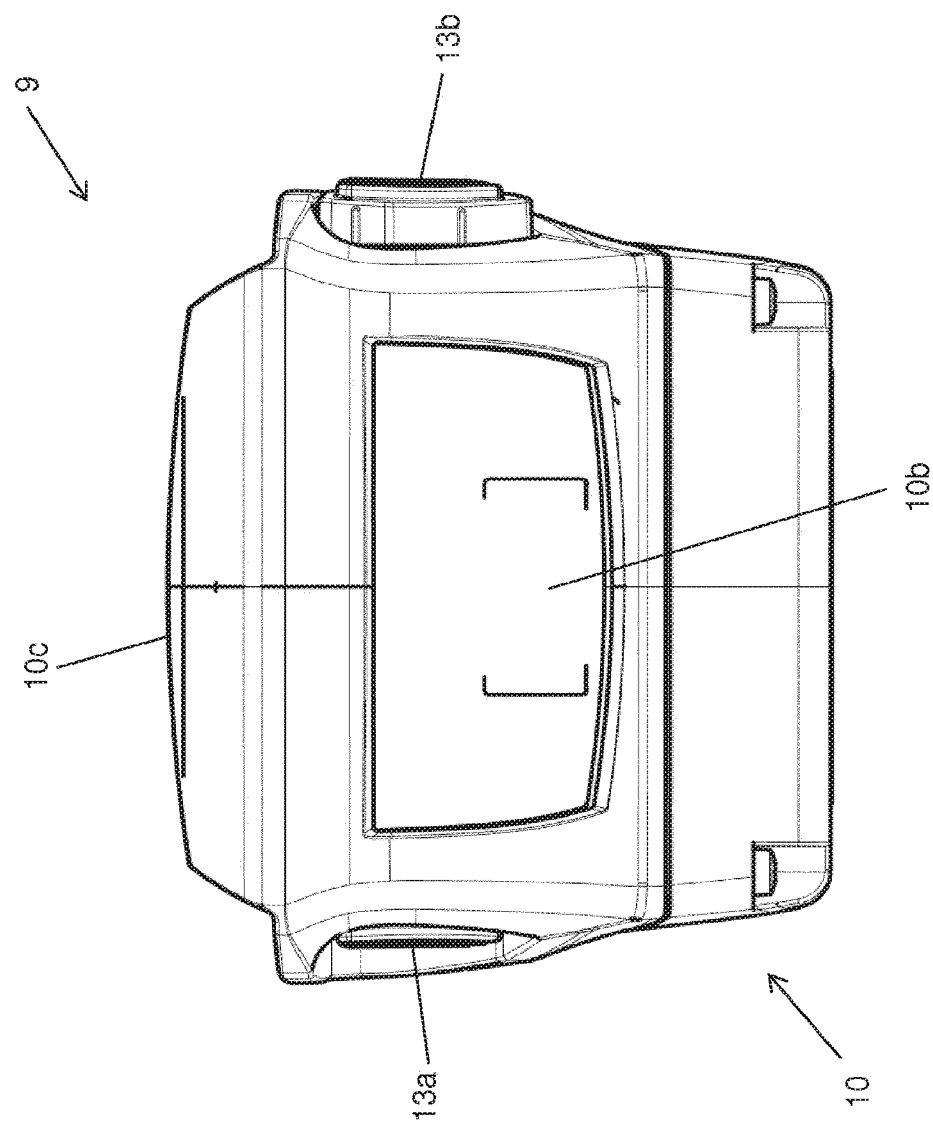
Figure 7:
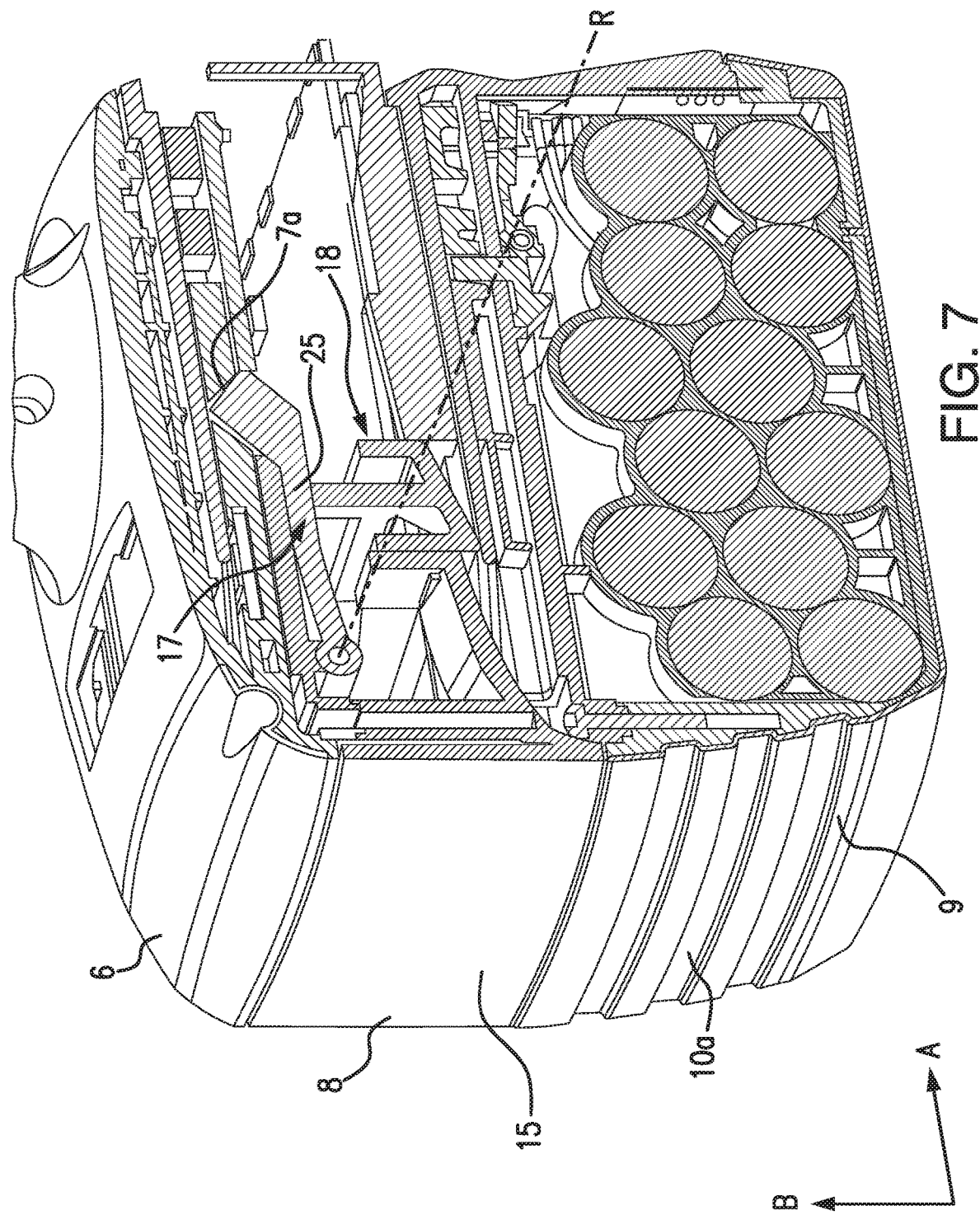
Figure 8:
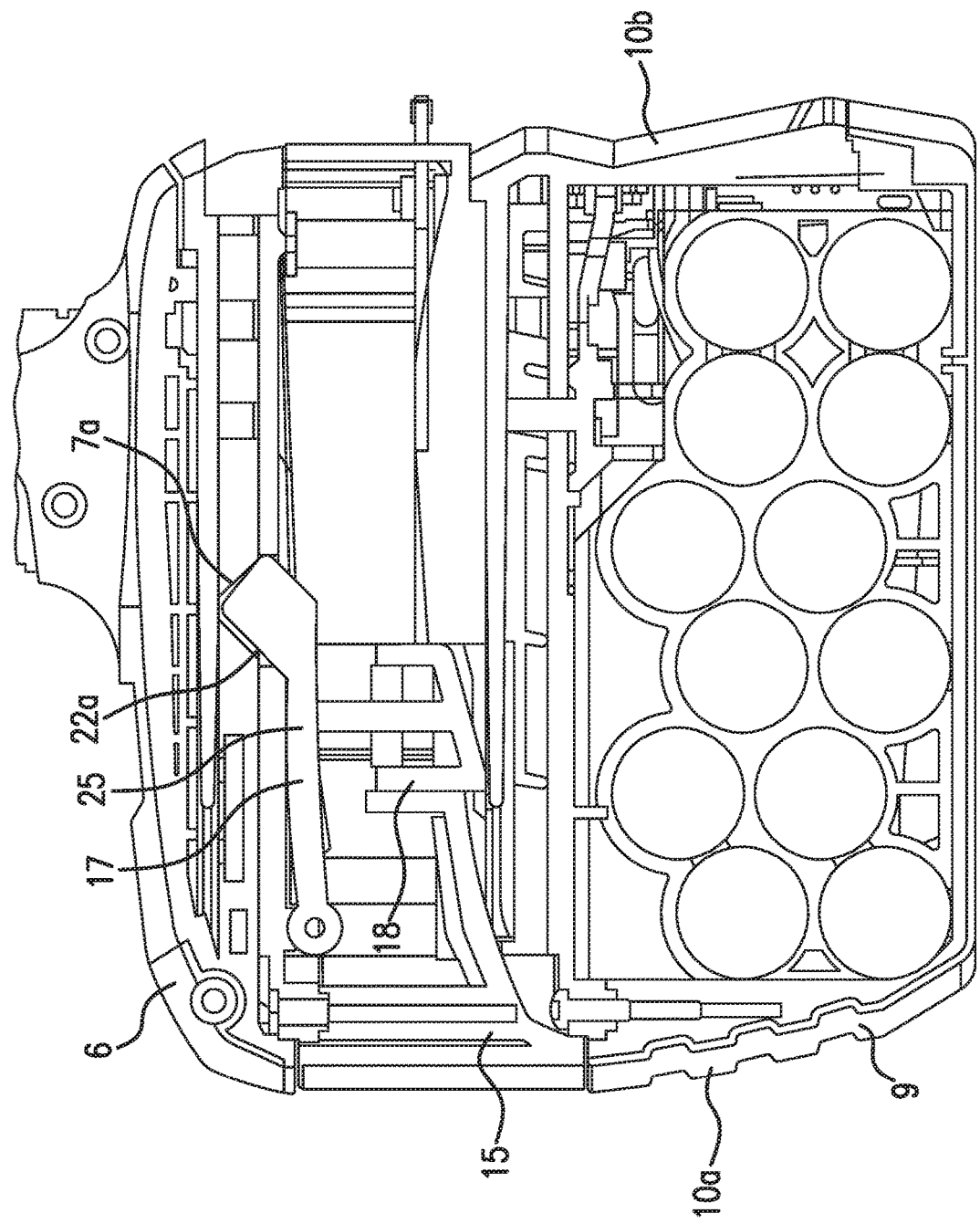
Figure 9:
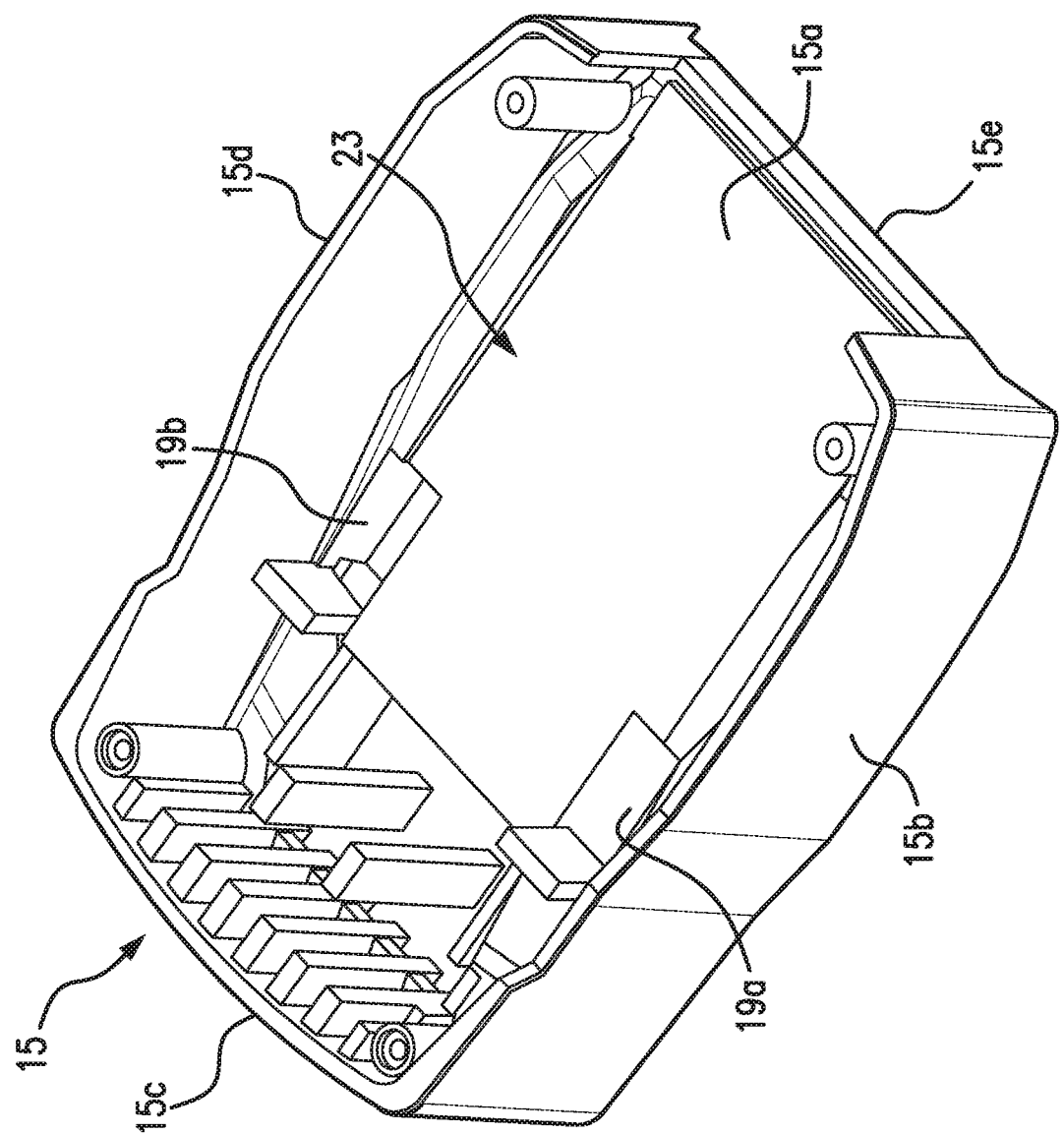
Figure 10:
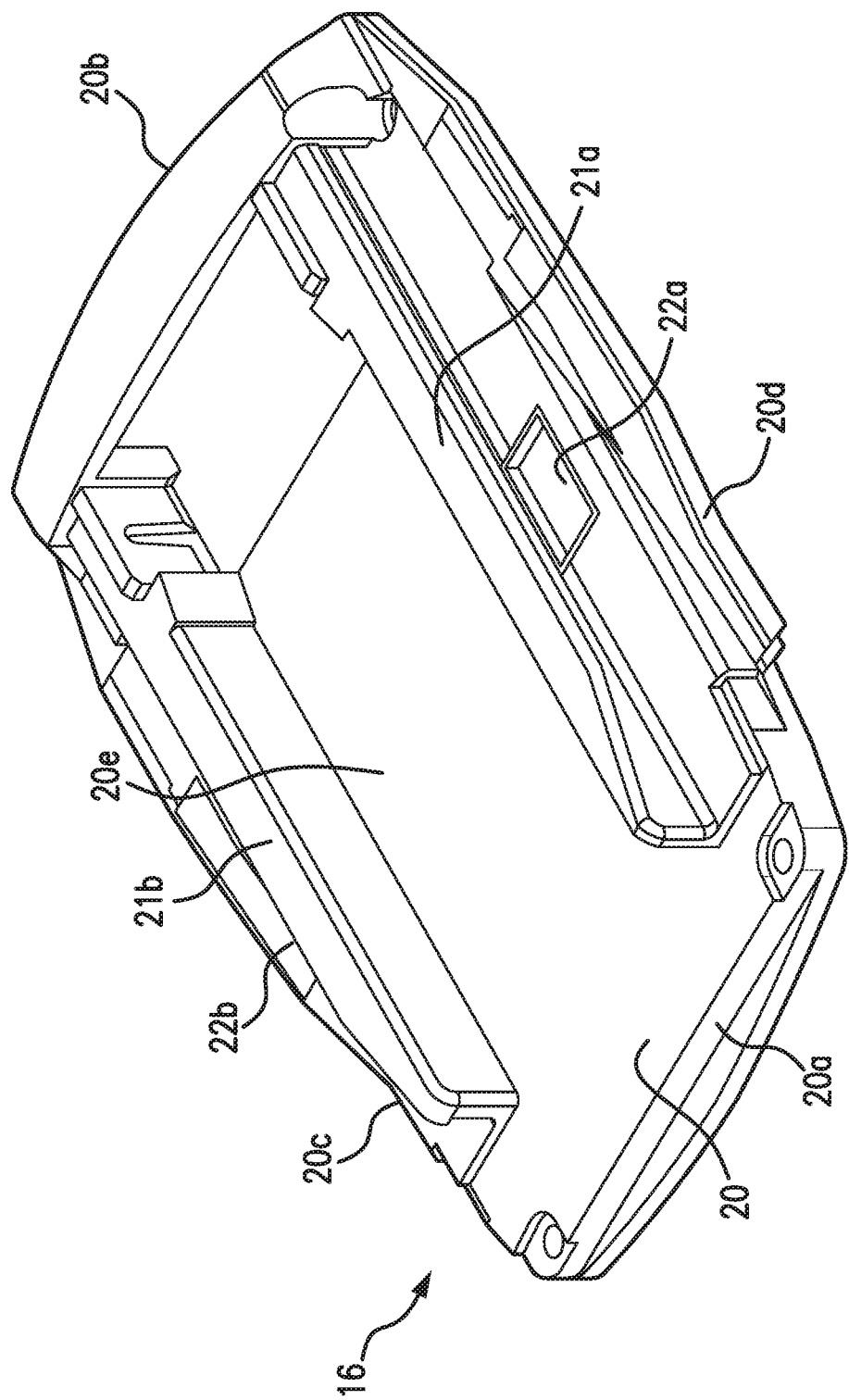
Figure 11:
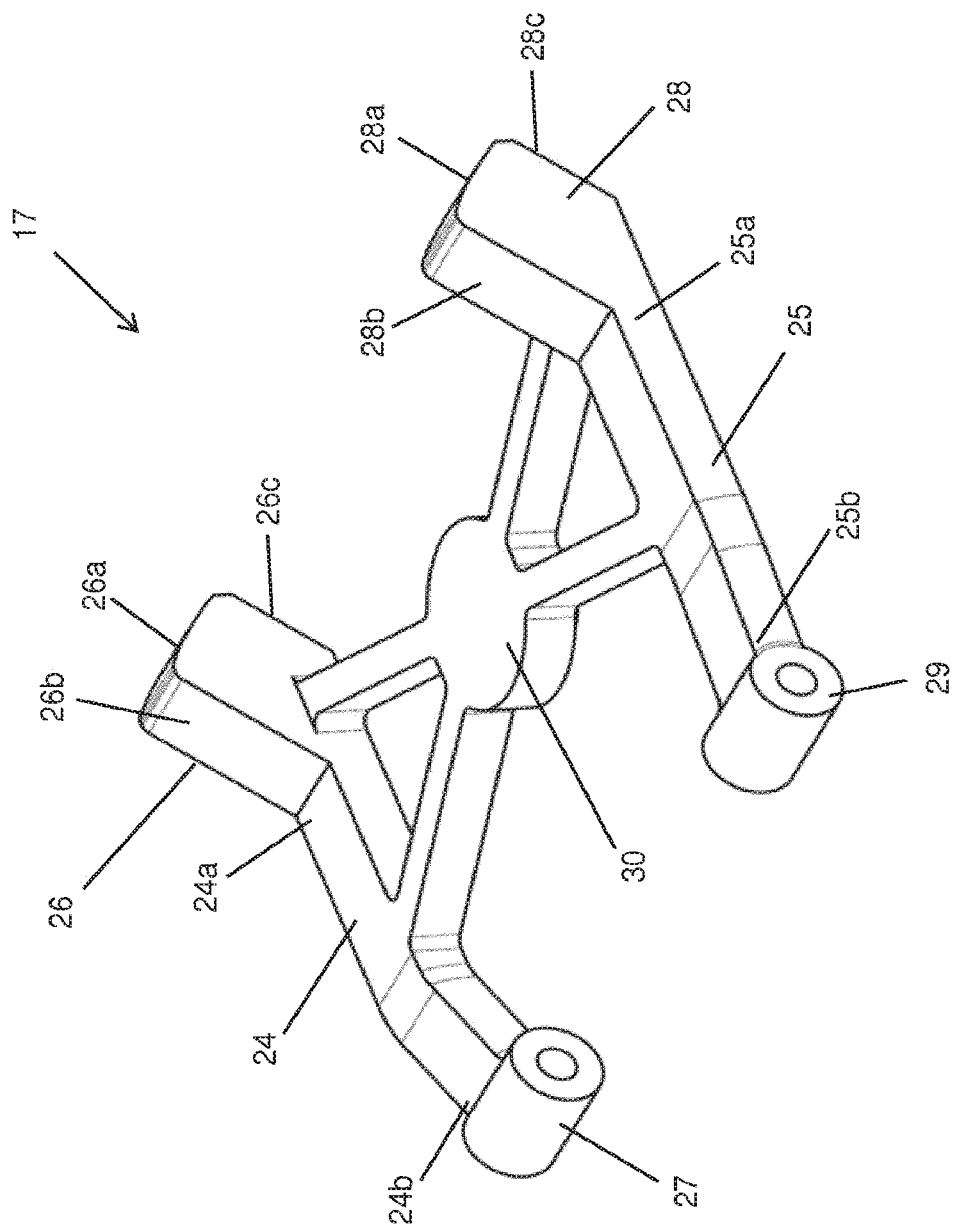
Figure 12:
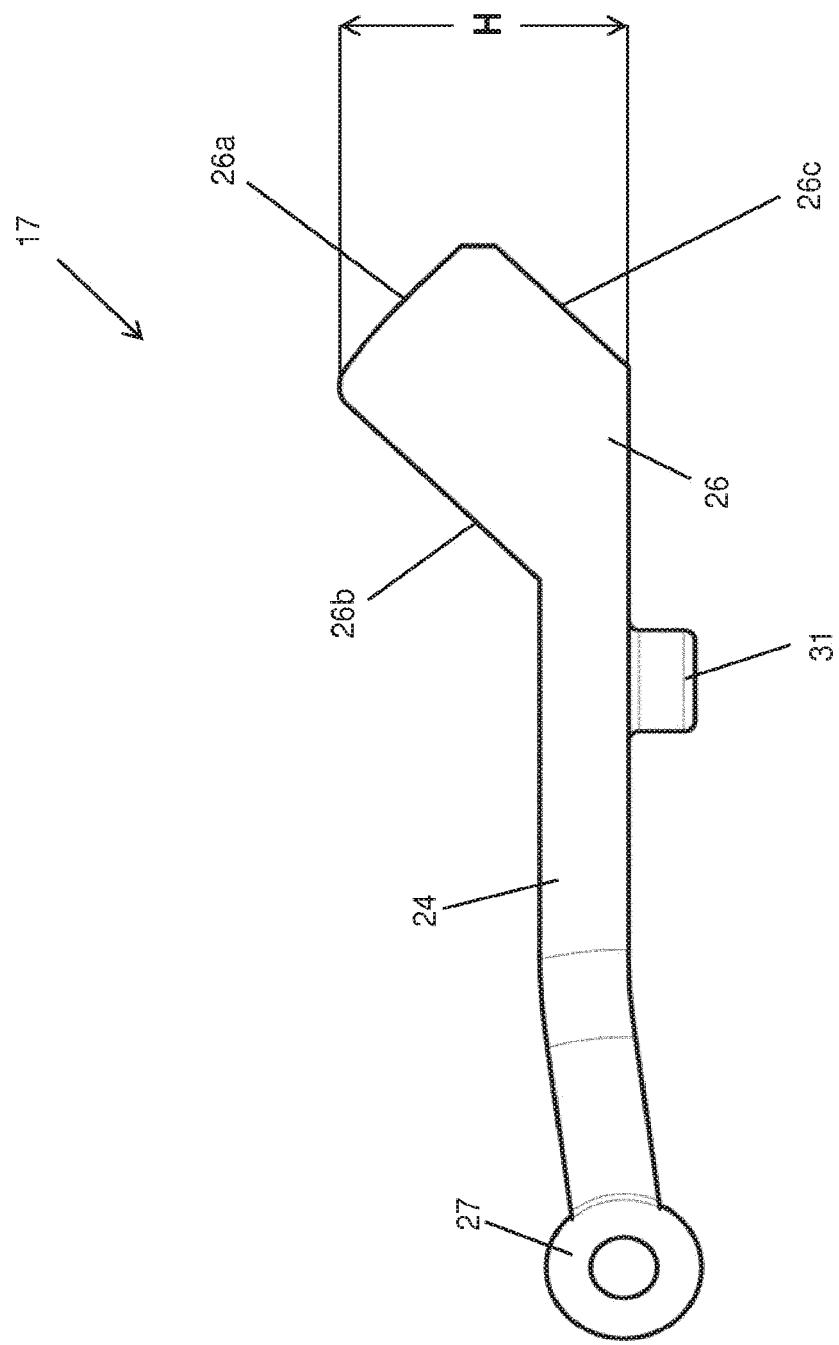
Figure 13:
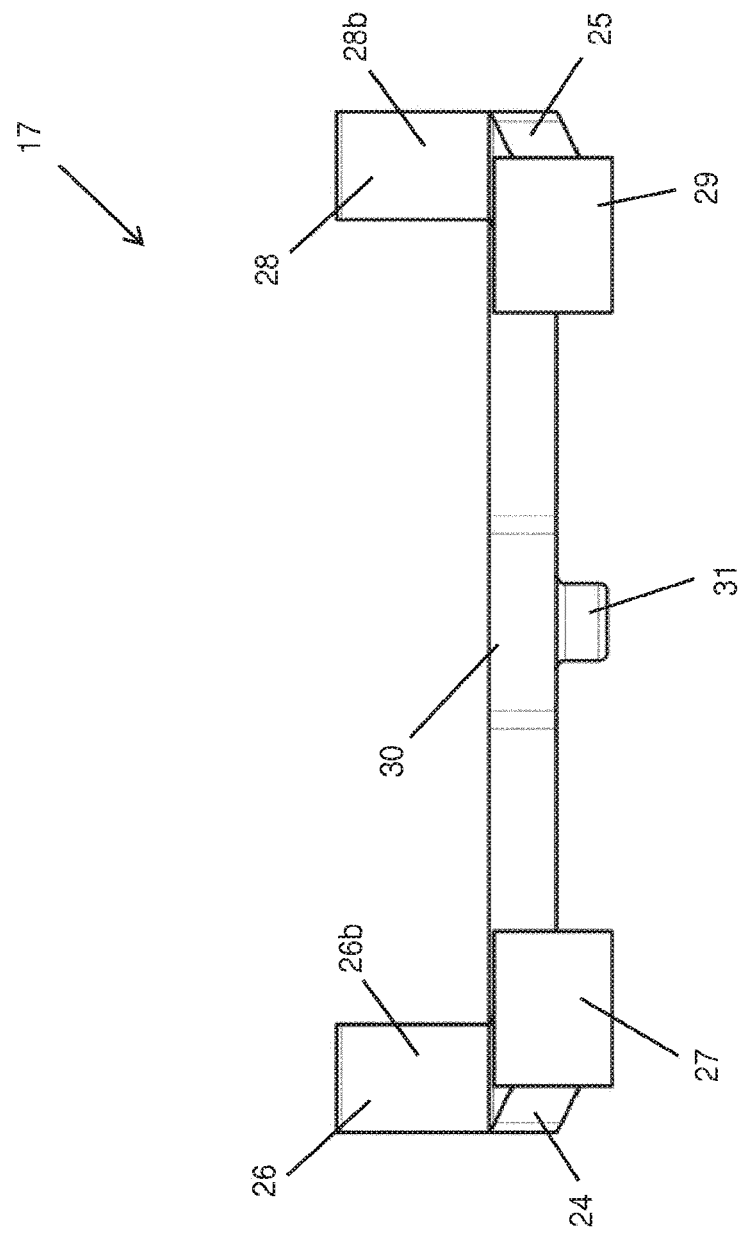
Figure 14:
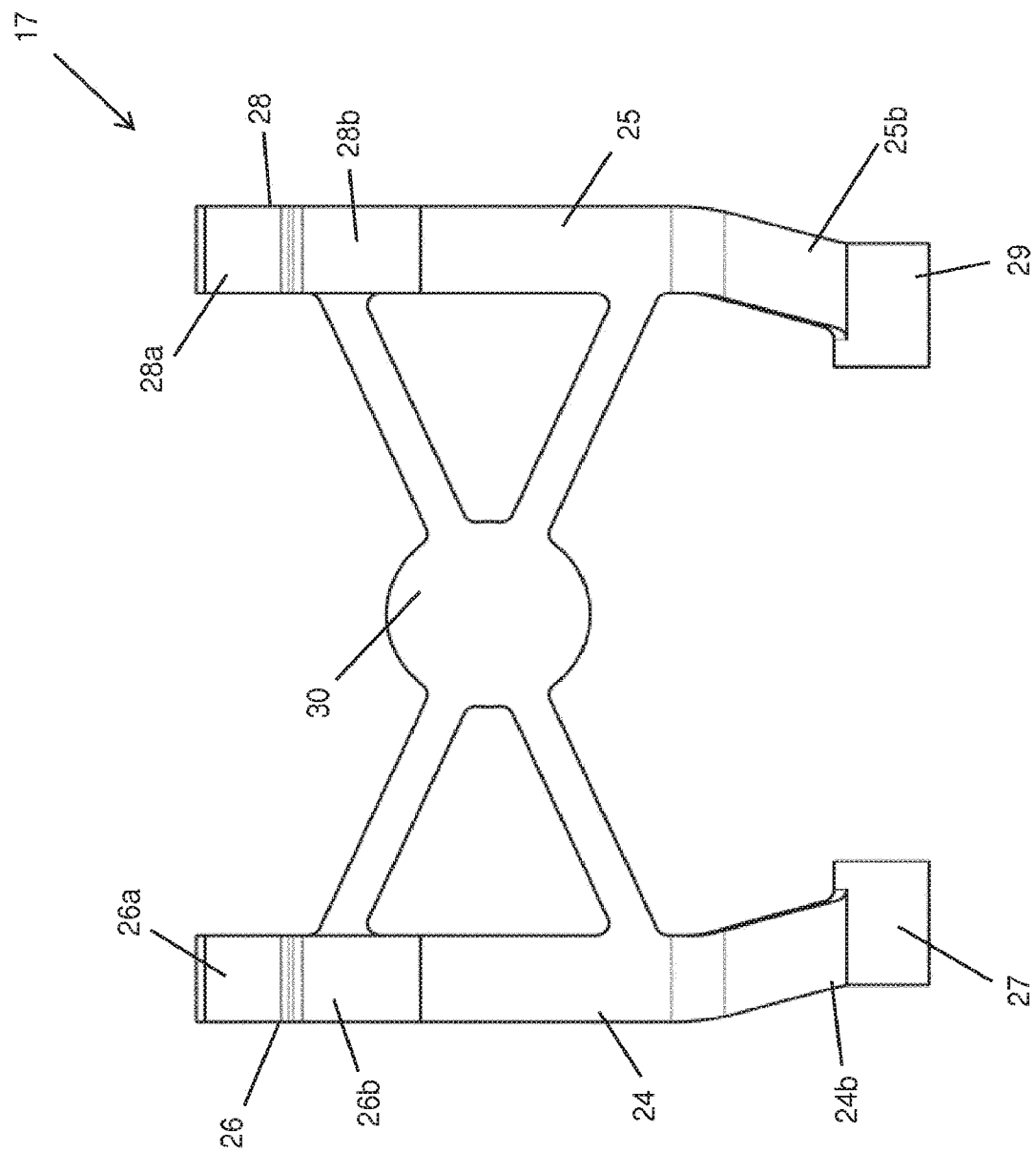
Figure 15:
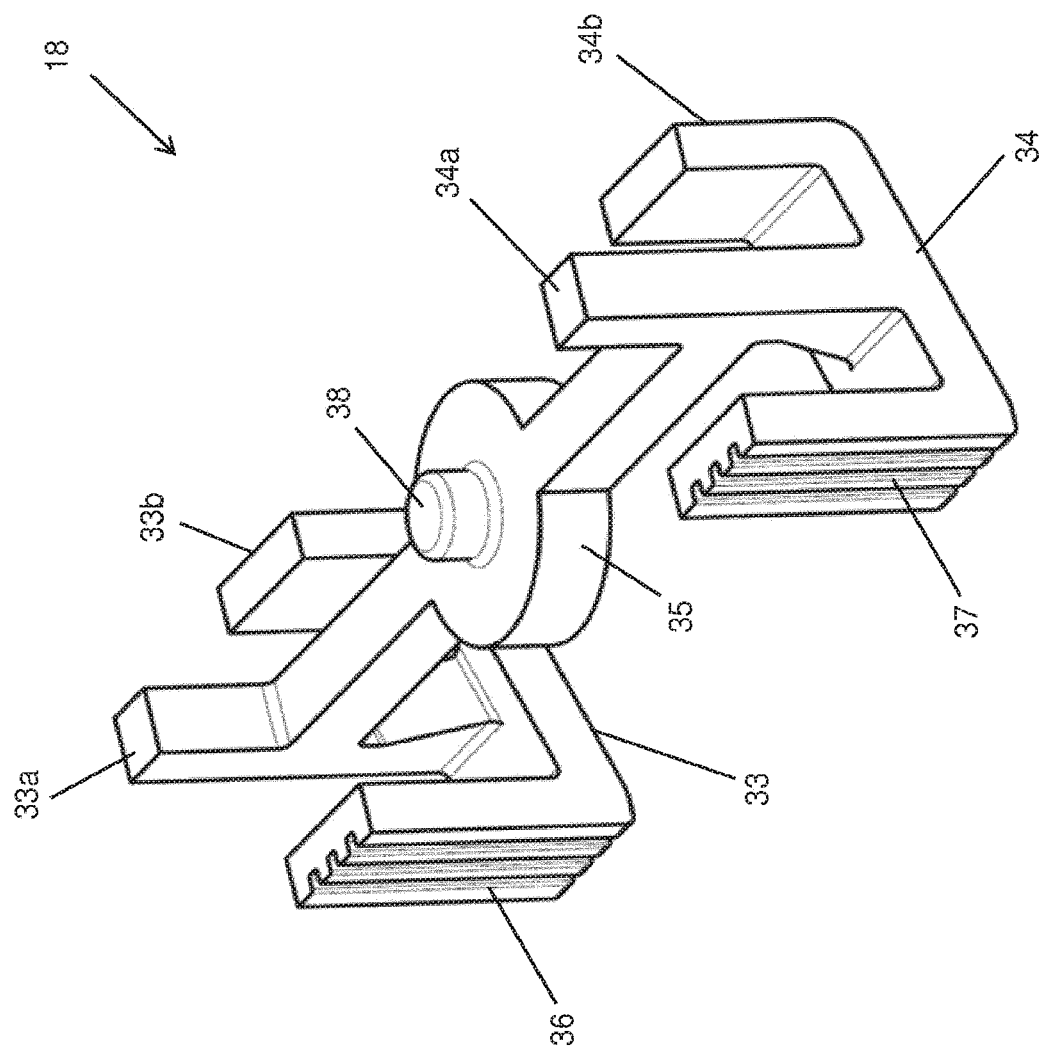
Figure 16:
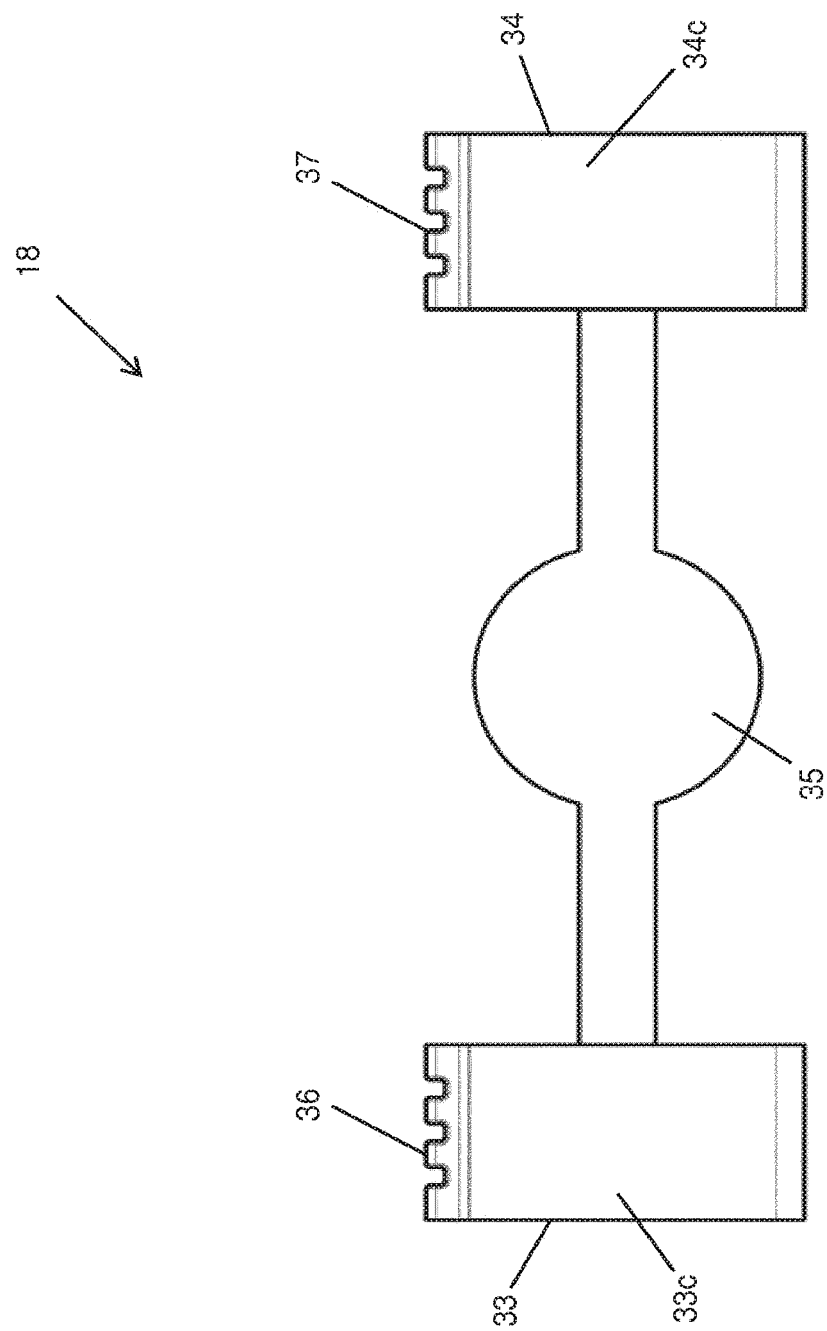
Figure 17:
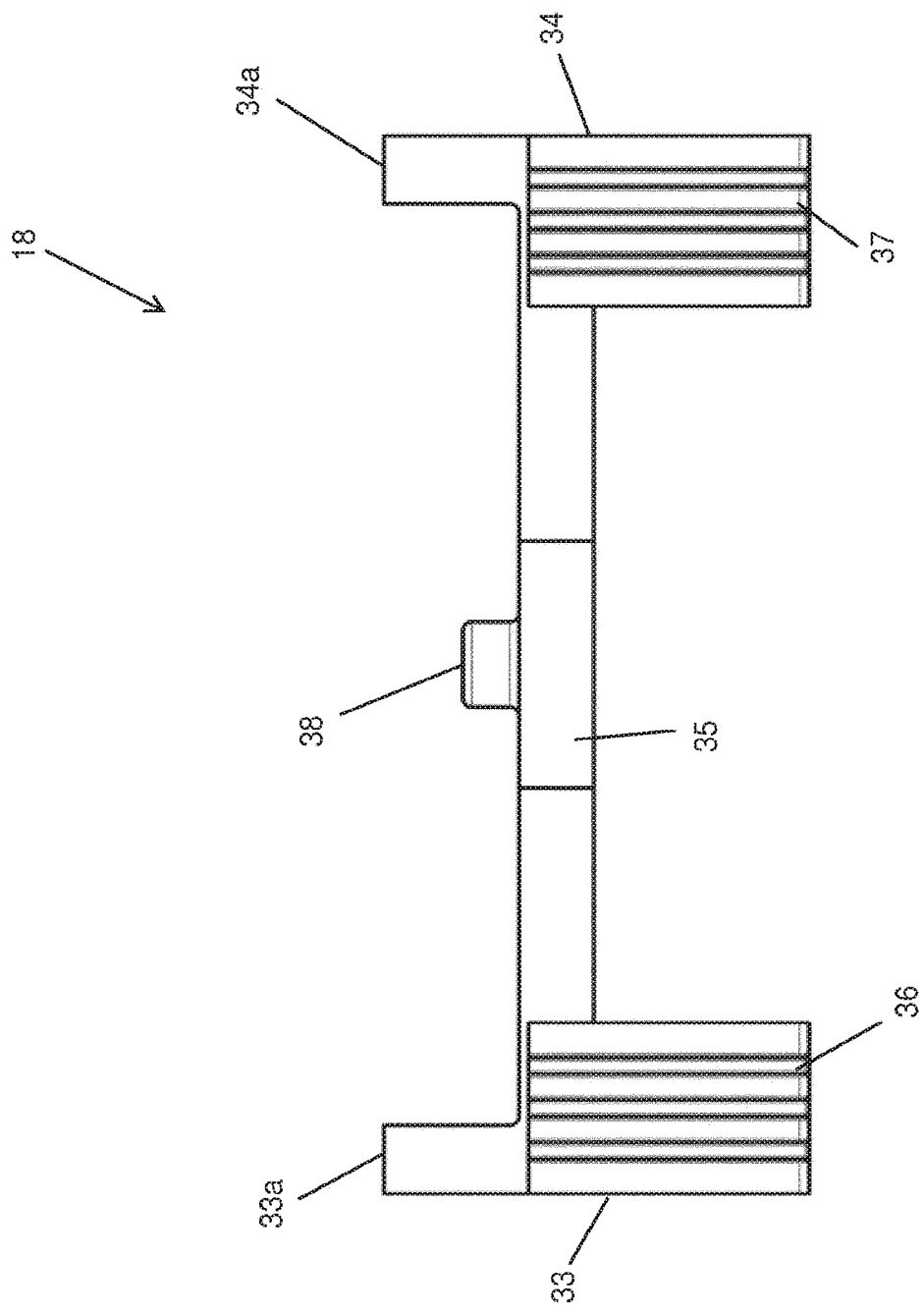
Figure 18:
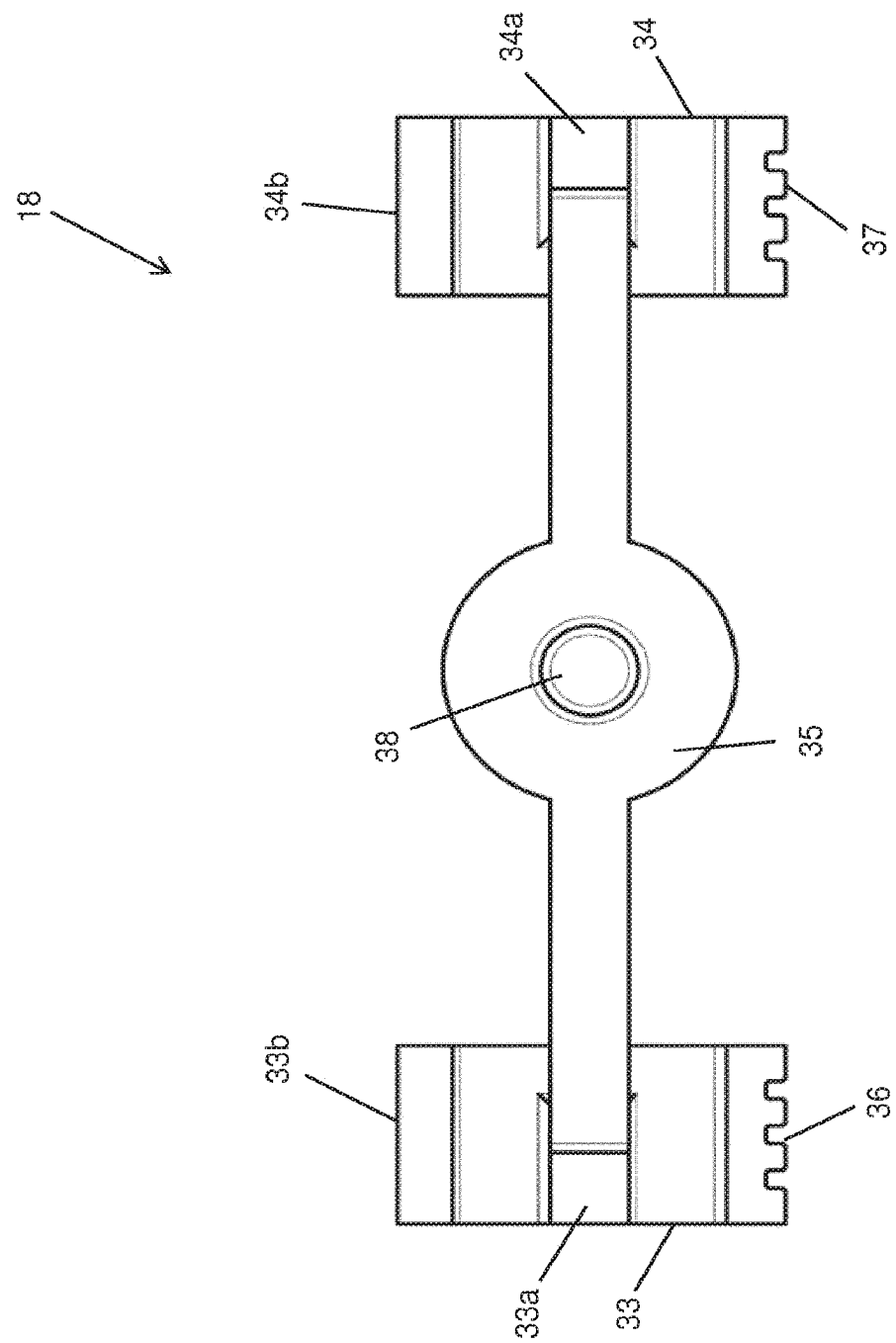
Figure 19:
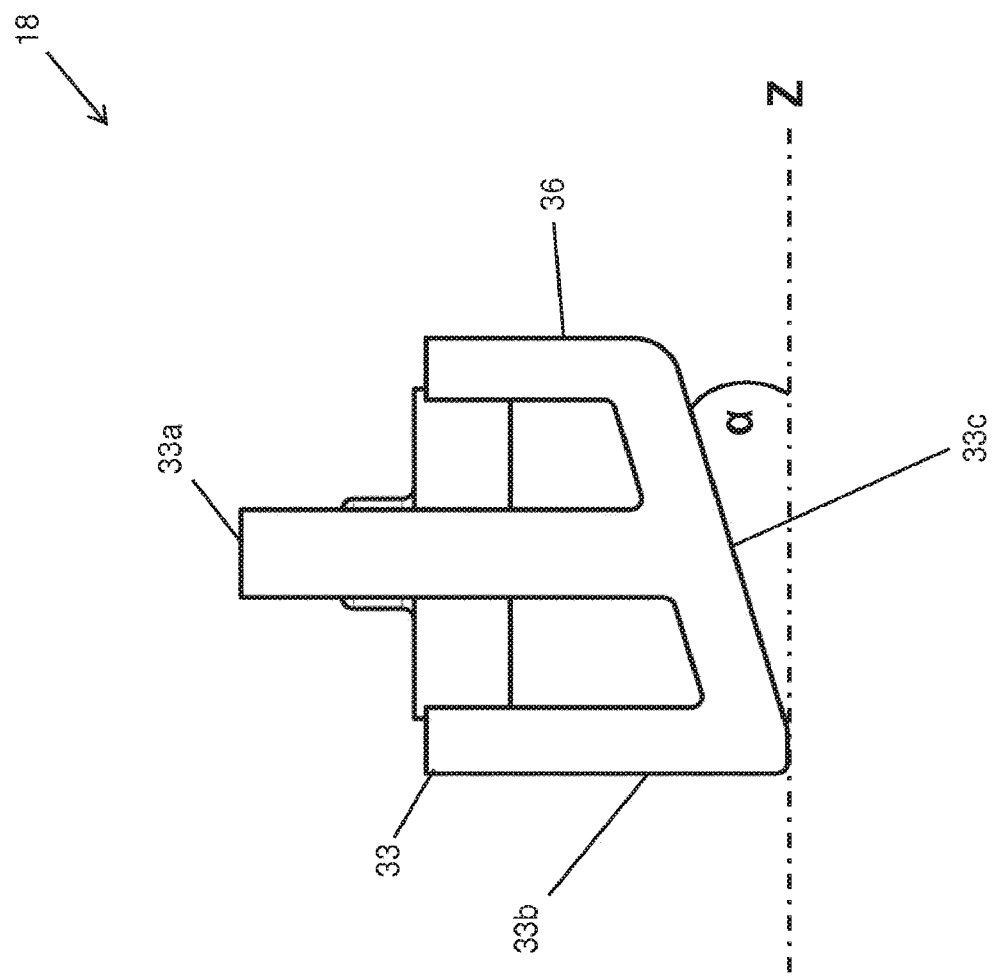
Figure 20:
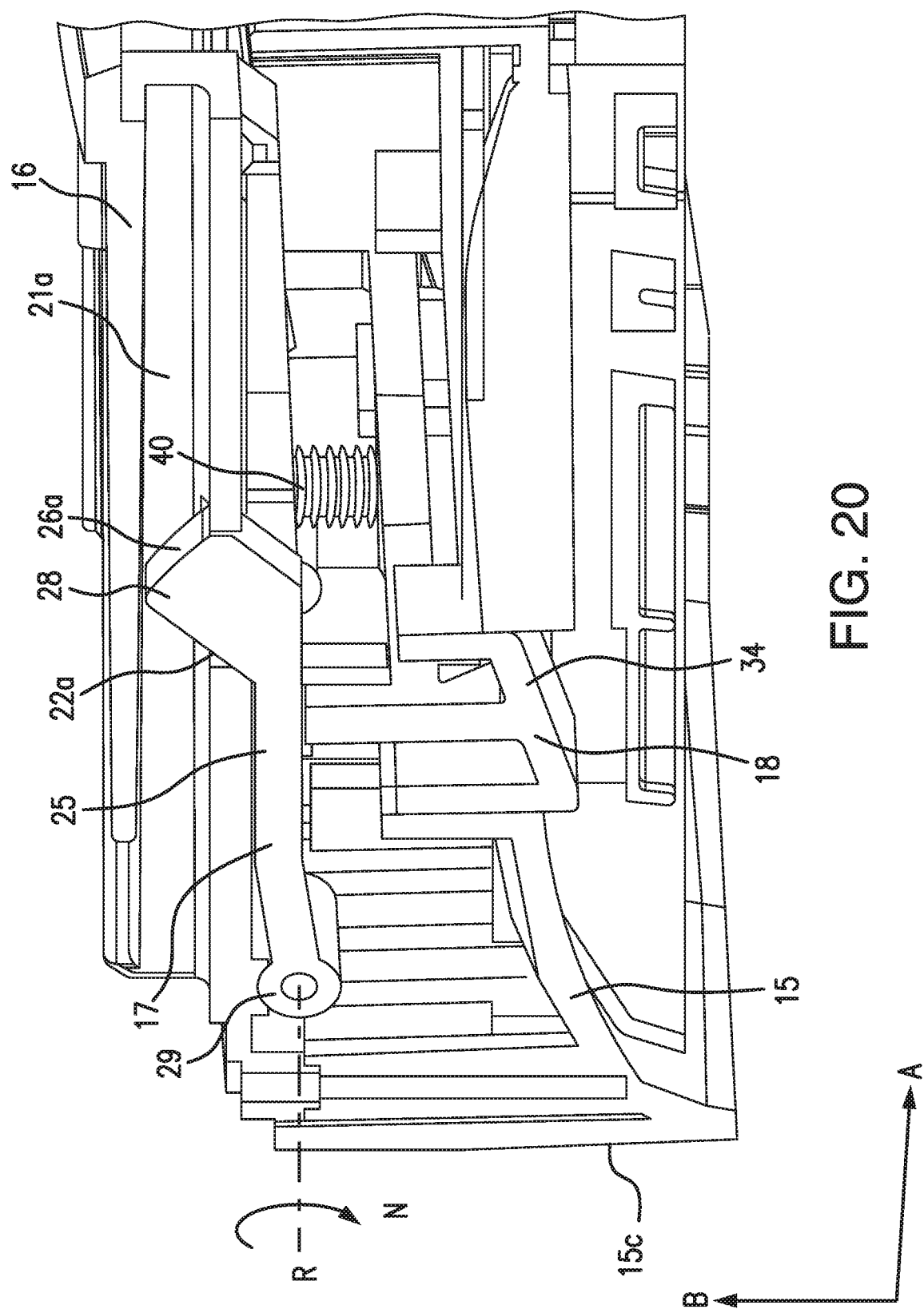
Figure 21:
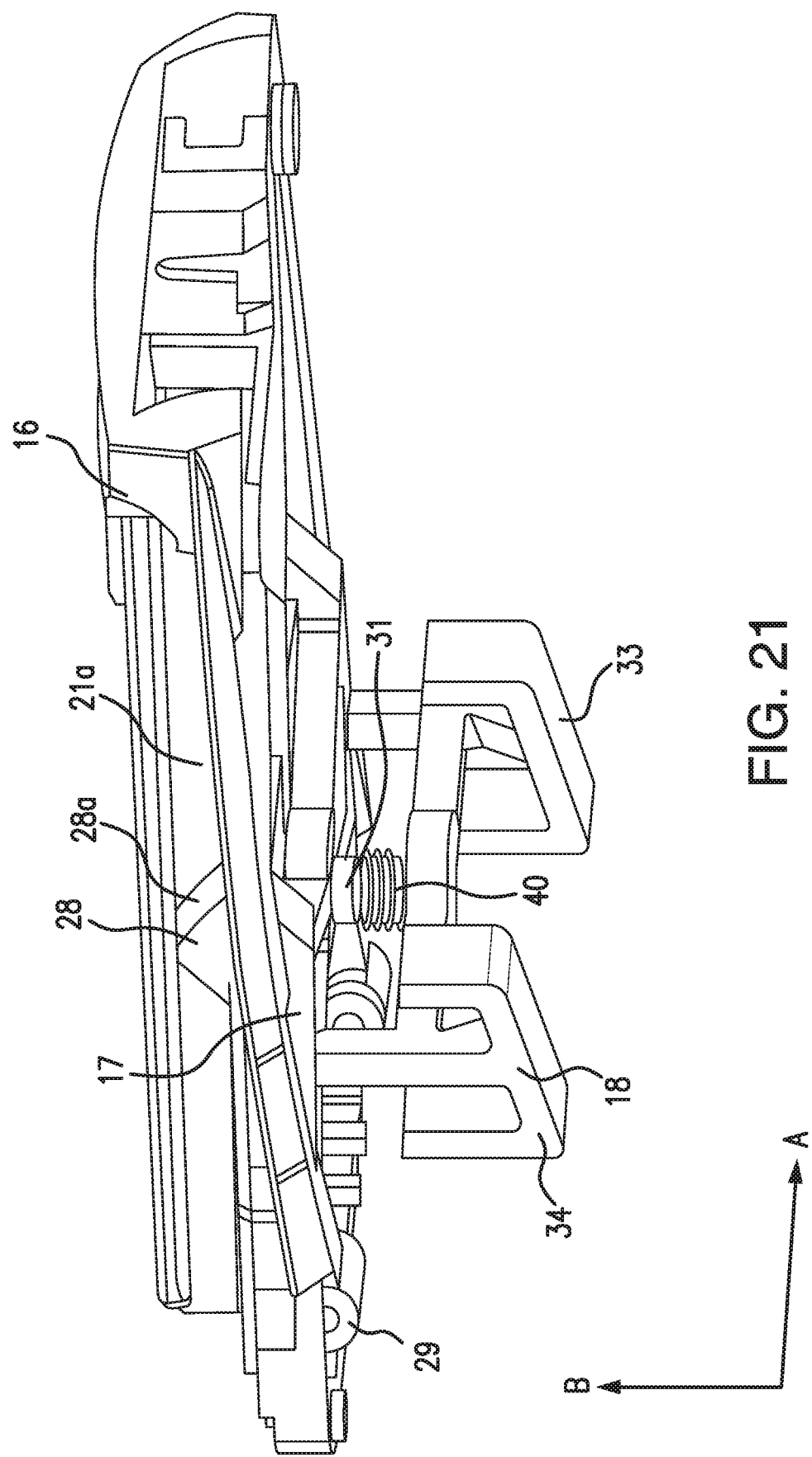
Figure 22:
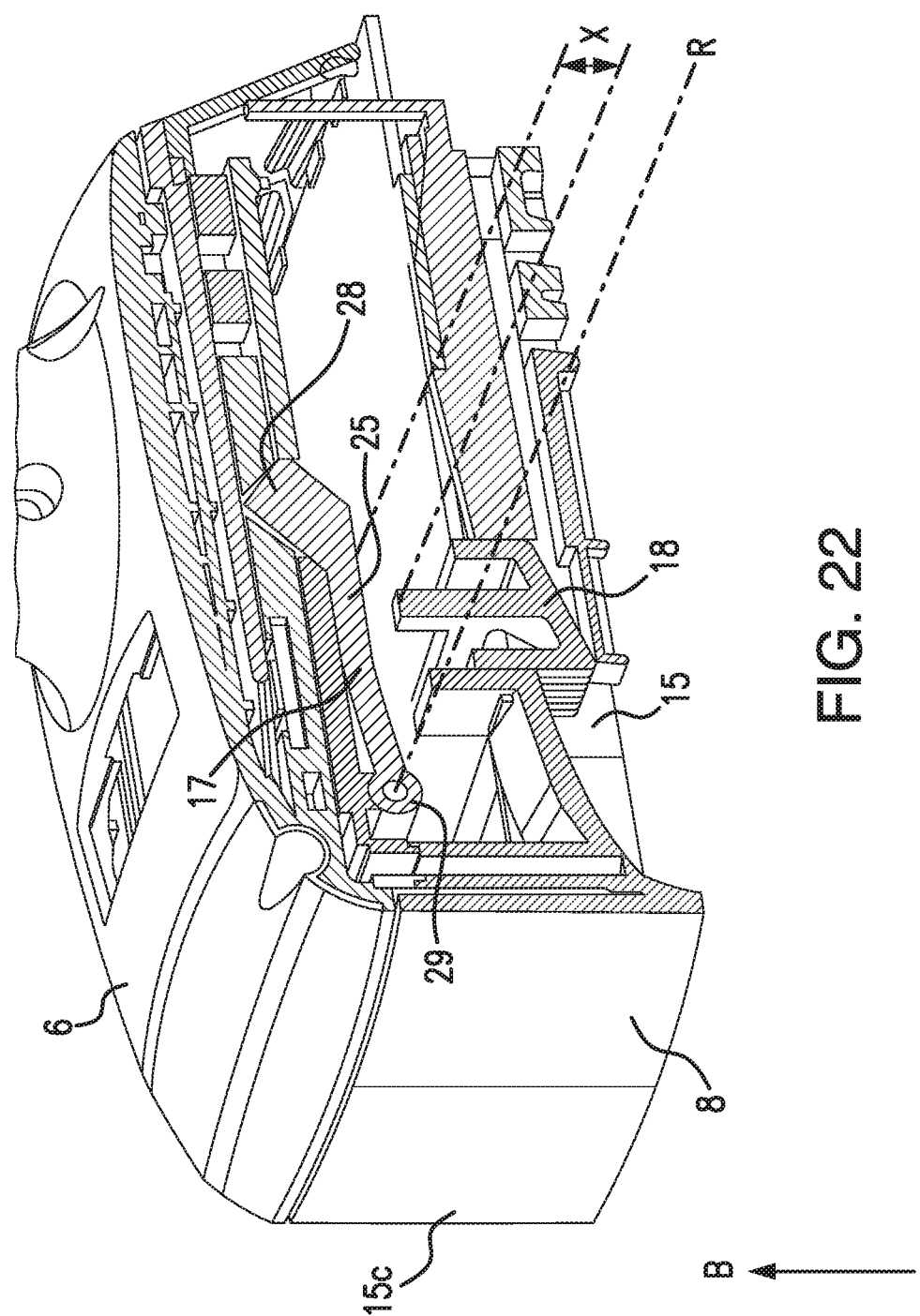
Figure 23:
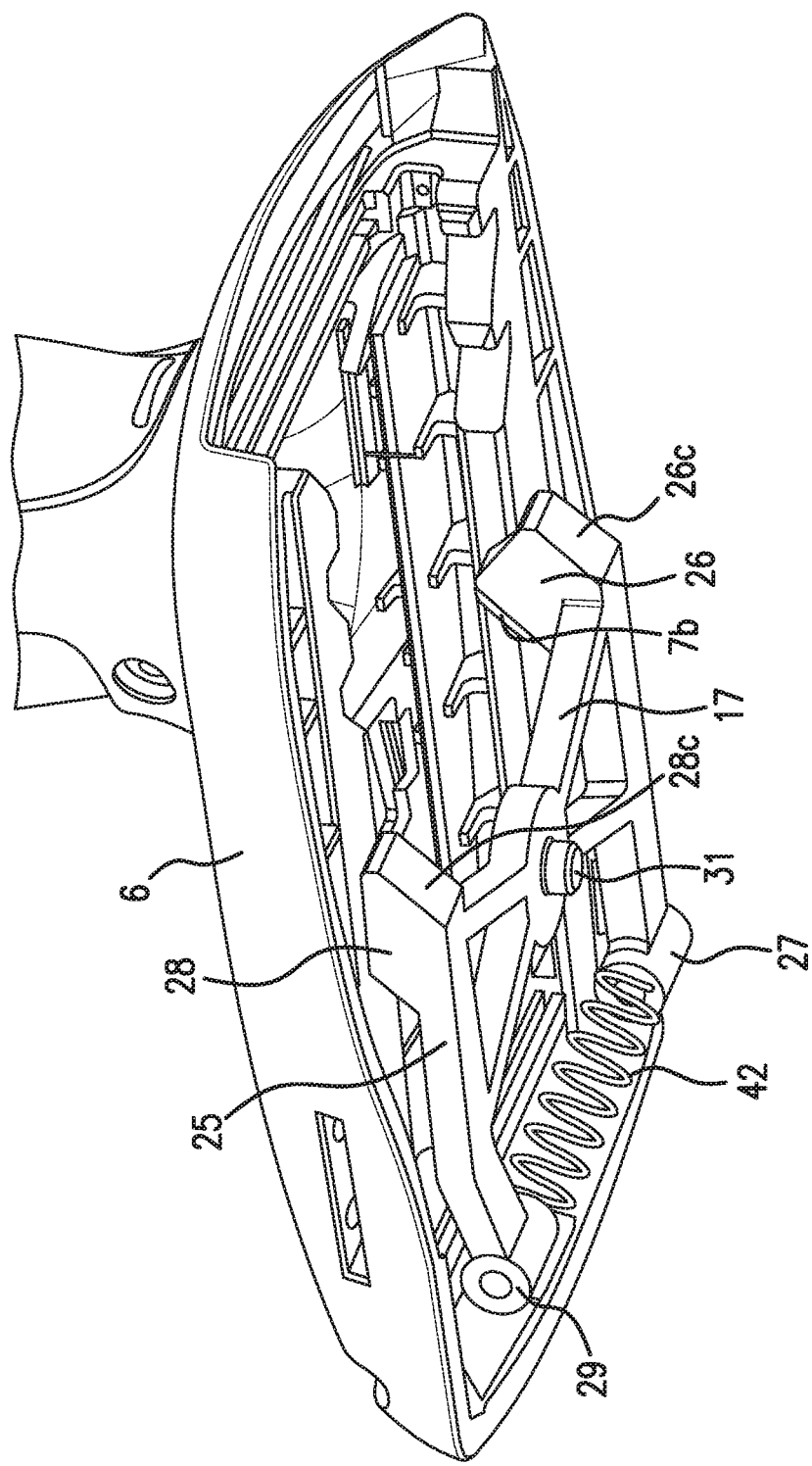
Figure 24:
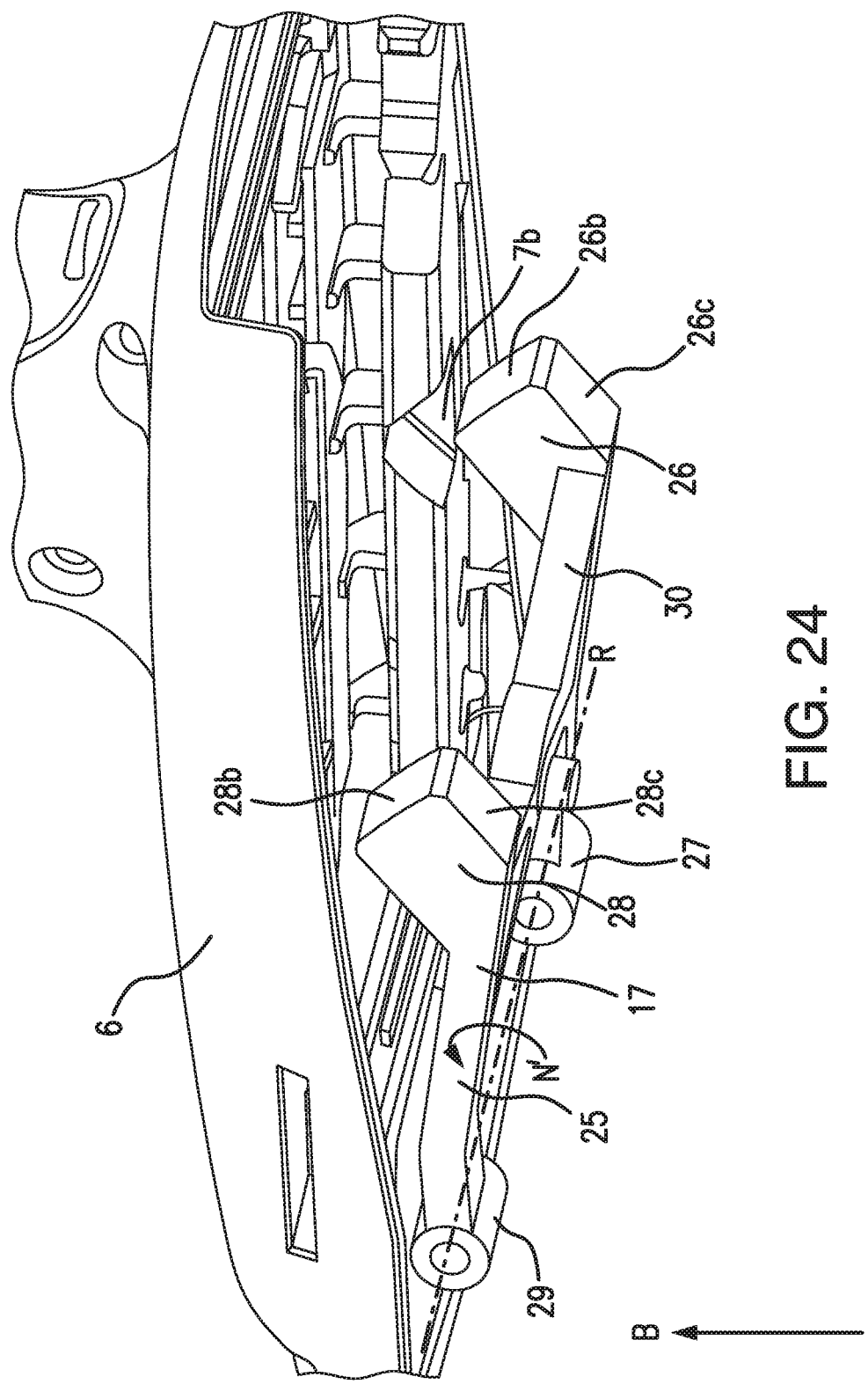
Figure 25:
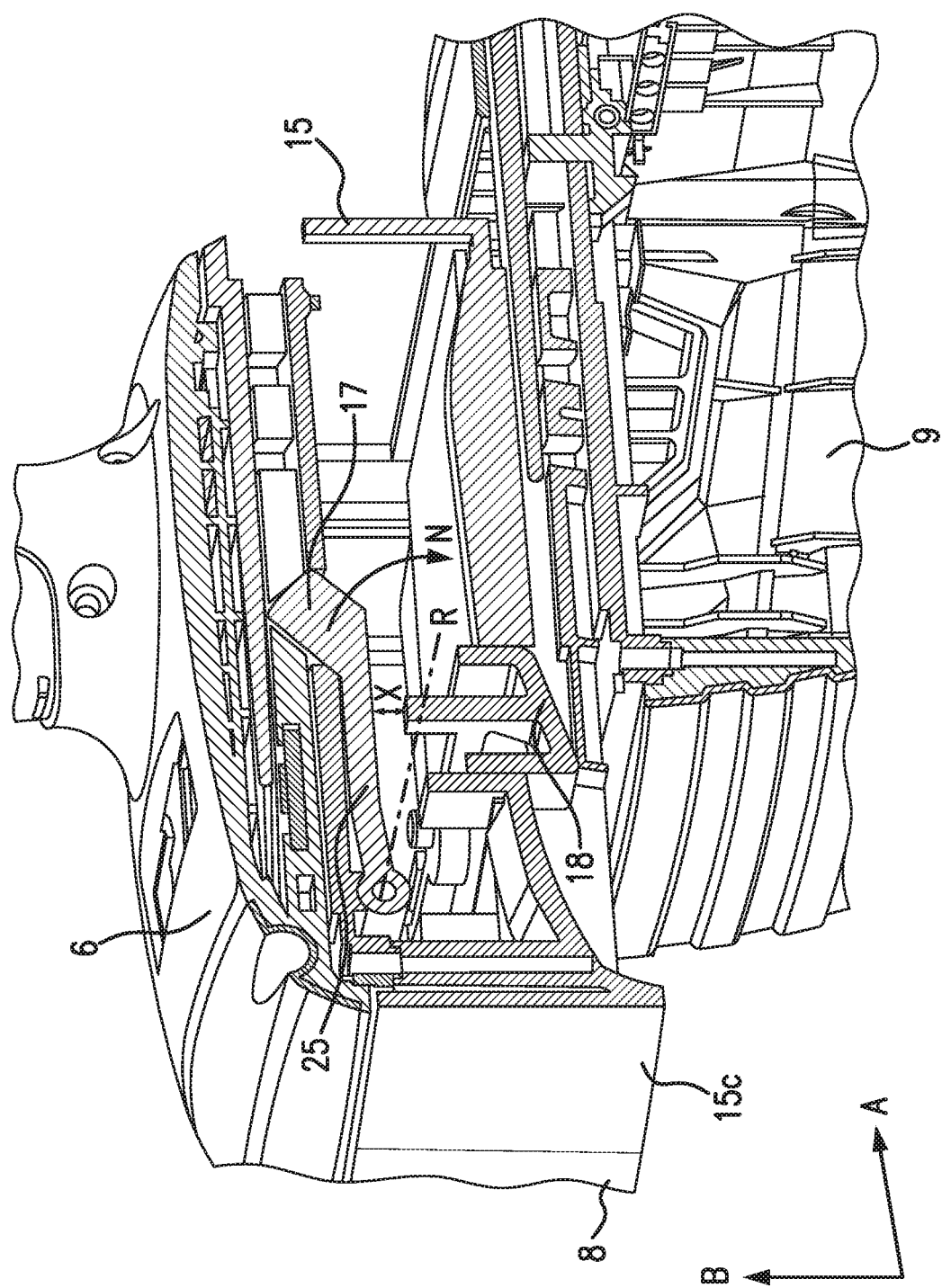
Figure 26:
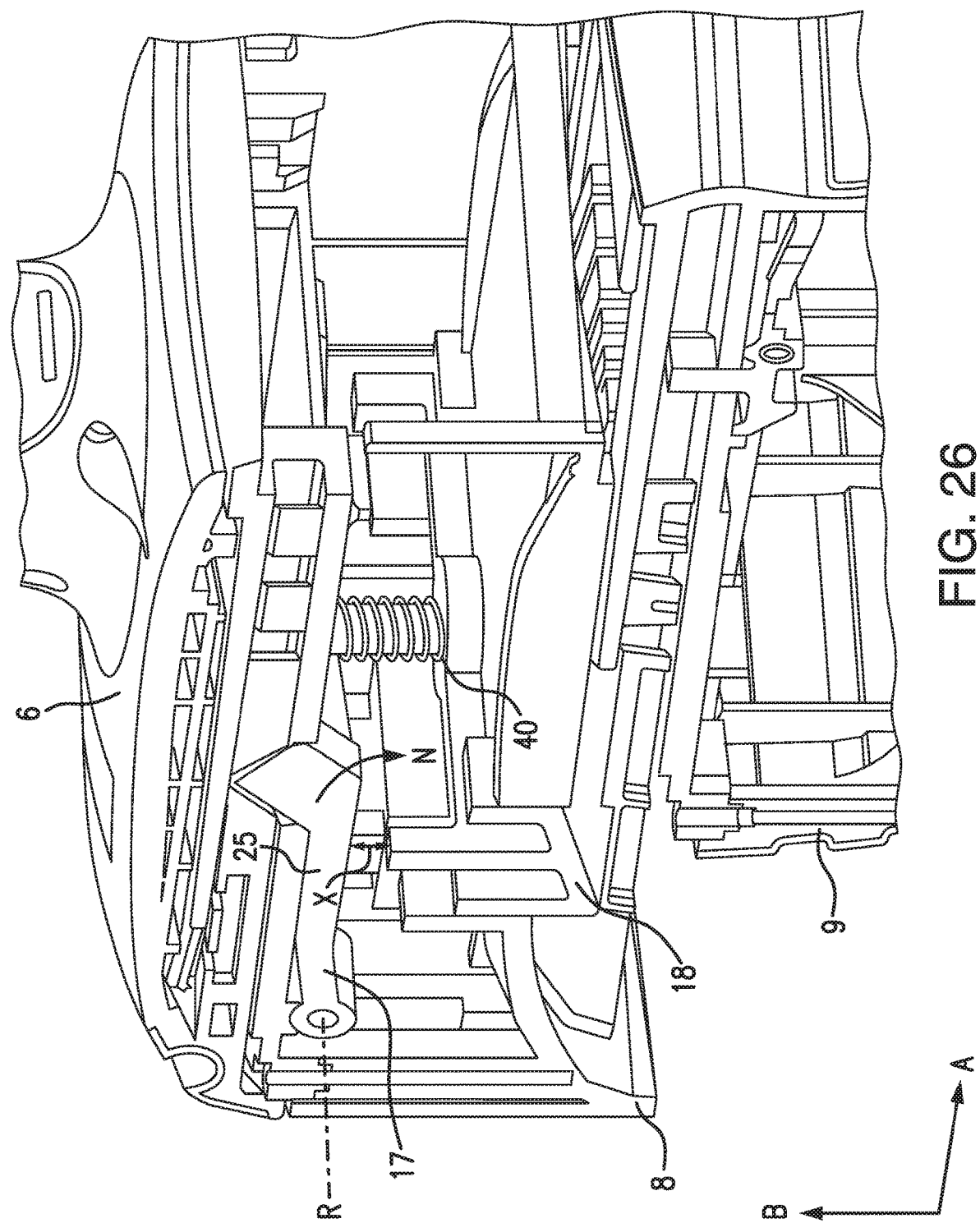

The following is shown:

FIG. 1 a power tool with a claimed adapter apparatus and a rechargeable battery in an assembled state;

FIG. 2 the power tool with the adapter apparatus and the rechargeable battery in an assembled state;

FIG. 3 a perspective view of the rechargeable battery;

FIG. 4 a top view of the rechargeable battery;

FIG. 5 a side view of the rechargeable battery;

FIG. 6 a rear view of the rechargeable battery;

FIG. 7 a perspective sectional view of a base element of the power tool, the adapter apparatus and the rechargeable battery;

FIG. 8 a lateral sectional view of a base element of the power tool, the adapter apparatus and the rechargeable battery;

FIG. 9 a perspective view of a housing element of the adapter apparatus;

FIG. 10 a perspective view of a cover element of the adapter apparatus;

FIG. 11 a perspective view of a latching device for latching the adapter apparatus to the power tool;

FIG. 12 a side view of the latching device;

FIG. 13 a front view of the latching device;

FIG. 14 a bottom view of the latching device;

FIG. 15 a perspective view of a locking device for locking the latching device;

FIG. 16 a bottom view of the locking device;

FIG. 17 a front view of the locking device;

FIG. 18 a top view of the locking device;

FIG. 19 a side view of the locking device;

FIG. 20 a perspective detailed view of the adapter apparatus with the latching device in the first position, the locking device in the first position and a compression spring element between the latching device and the locking device;

FIG. 21 a perspective detailed view of the cover element of the adapter apparatus, the latching device in the first position and the locking device in the first position;

FIG. 22 a perspective sectional view of the base element of the power tool, the cover element of the adapter apparatus, a housing of the adapter apparatus, the latching device in the first position and the locking device in the second position;

FIG. 23 a perspective view of the base element of the power tool, the latching device in the first position and a torsion spring;

FIG. 24 a perspective view of the base element of the power tool and the latching device in the second position;

FIG. 25 a perspective sectional view of the base element of the power tool, the adapter apparatus with the locking device in the second position and the rechargeable battery displaced by the power tool; and FIG. 26 a further perspective sectional view of the base element of the power tool, the adapter apparatus with the locking device in the second position and the rechargeable battery offset by the power tool.

DETAILED DESCRIPTION OF THE INVENTION

FIG. 1 shows a power tool 1 in the form of a cordless screwdriver. The power tool 1 primarily contains a housing 2, a housing receptacle 3 and a handle piece 4.

The housing 2 has a front end 2a, a rear end 2b, an upper side 2c and a lower side 2d. The tool receptacle 3 is positioned at the front end 2a of the housing 2 and serves to receive a tool in the form of a bit. The tool is not shown in the drawings.

The handle piece 4 contains an upper end 4a and a lower end 4b, wherein said handle piece 4 is attached by its upper end 4a to the lower side 2d of the housing 2. The handle piece 4 has a switch 5 with which the power tool 3 can be activated. A base element 6 is provided on the lower end 4b of the handle piece 4. Said base element 6 primarily contains an upper side 6a, a lower side 6b, a left side 6c and a right side 6d. The right side 6d is identical to the left side 6c and is not shown in the drawings. A first angular recess 7a and a second angular recess are provided on the lower side 6b (cf. FIG. 7). The first angular recess 7a is located in the vicinity of the left side 6c and the second angular recess is located in the vicinity of the right side 6d. The second angular recess is identical to the first angular recess 7a, but it is not shown in the drawings.

A claimed adapter apparatus 8 is positioned on the base element 6 and is connected to a rechargeable battery 9. The adapter apparatus 8 serves primarily to connect the rechargeable battery 9 to the base element 6 of the power tool 1. The rechargeable battery 9 provides the power tool 1 with electric voltage. FIG. 1 shows the power tool 1, the adapter apparatus 8 and the rechargeable battery 9 in an assembled state. By contrast, FIG. 2 shows the power tool 1, the adapter apparatus 8 and the rechargeable battery 9 in a disassembled state. As is described in detail below, the adapter apparatus 8 is disclosed relative to the base element 6 of the power tool 1 and the rechargeable battery 9 is displaced relative to the adapter apparatus 8 in direction A for this purpose.

FIGS. 3, 4, 5 and 6 show the rechargeable battery 9, which primarily contains a battery housing 10, a first guiding track 11a, a second guiding track 11b and an actuation device 12. The battery housing 10 itself has a front side 10a, a rear side 10b, an upper side 10c, a lower side 10d, a left side 10e and a right side 10f (only the left side 10e is shown in the drawings).

The first and second guiding tracks 11a, 11b are positioned on the upper side 10c of the battery housing 10 and run in direction A along a longitudinal extent of the battery housing 10.

The actuation device 12 contains a first actuation element 13a, a second actuation element 13b, a first blocking wedge 14a and a second blocking wedge 14b (only the first actuation element and the first blocking wedge are shown in the drawings). The first actuation element 13a is positioned on the left side 10e and the second actuation element 13b is positioned on the right side 10f. Both the first actuation element 13a and the second actuation element 13b are configured in the form of a pressure switch. The first blocking wedge 14a is positioned on the first guiding track 11a and the second blocking wedge 14b is positioned on the second guiding track 11b. The actuation device 12 serves to latch the rechargeable battery 9 to the adapter apparatus 8 and then release it from the adapter apparatus 8. To do so, the first blocking wedge 14a is activated by the first actuation element 13a and the second blocking wedge 14b is activated by the second actuation element 13b.

FIG. 7 shows a sectional view through the base element 6 of the power tool 1, the adapter apparatus 8 and the rechargeable battery 9.

The adapter apparatus 8 primarily contains an adapter housing 15, an adapter cover 16, a latching device 17 and a locking device 18.

The adapter housing 15 is shown in FIG. 9 and primarily contains a base 15a, a first side wall 15b, a second side wall 15c, a third side wall 15d and a fourth side wall 15e. A first rectangular opening 19a and a second rectangular opening 19b are provided in the base 15a. The first opening 19a is located in the vicinity of the first side wall 15b and the second opening 19b is located in the vicinity of the third side wall 15d.

The adapter cover 16 is shown in FIG. 10 and primarily contains a rectangular base plate 20. The base plate 20, in turn, has a front lateral edge 20a, a rear lateral edge 20b, a right lateral edge 20c, a left lateral edge 20d, an upper side 20e and a lower side 20f. A first guiding track 21a and a second guiding track 21b extend on the upper side 20e of the adapter cover 16. The first and second guiding tracks 21a, 21b extend along the longitudinal extent of the adapter cover 16. A first opening 22a is provided in the vicinity of the left lateral edge 20d and against the first guiding track 21a. Moreover, a second opening 22b is provided in the vicinity of the right lateral edge 20c and against the second guiding track 21b. The first and second openings 22a, 22b are identical, although only the first opening 22a is clearly recognizable in the drawings. The lower side 20f of the adapter cover 16 is positioned on and attached to the adapter housing 15. In so doing, a cavity 23 is created in the adapter housing 15 by the first, second, third and fourth side walls 15b, 15c, 15d, 15e of the adapter housing 15 and by the base plate 20 of the adapter cover 16. When the adapter cover 16 is attached to the adapter housing 15, the adapter apparatus 8 can be connected to the base element 6 of the power tool 1 with the aid of the two guiding tracks 21a, 21b. The base element 6 of the power tool 1 contains receiving elements for this purpose which are not shown and into which the two guiding tracks 21a, 21b can be inserted so as to produce a releasable attachment between the adapter apparatus 8 and the base element 6 of the power tool 1.

The latching device 17 and the locking device 18 are arranged in the cavity 23 of the adapter apparatus 8 and the adapter housing 15. The configuration and arrangement of the latching device 17 and locking device 18 relative to each other are described in detail below.

The latching device 17 is shown by itself in FIGS. 11 through 14 and primarily comprises a first arm element 24, a second arm element 25 and a connecting piece 30.

The first arm element 24 has a first end 24a and a second end 24b. A first latching element 26 is positioned at the first end 24a of the first arm element 24. The first latching element 26 has a first surface 26a, a second surface 26b and a third surface 26c. The first surface 26a is orthogonal or perpendicular to the second and third surfaces 26b, 26c. The second surface 26b is arranged opposite the third surface 26c. A first pivot bearing 27 is positioned at the second end 24b of the first arm element 24. As is shown in FIG. 12, the latching element 26 has a height H.

The first latching element 26 is configured such that it can be accommodated in the first angular recess 7a of the base element 6 by the first and second surfaces 26a, 26b.

The second arm element 25 has a first end first end 25a and a second end 25b. A second latching element 28 is positioned at the first end 25a of the second arm element 25. The second latching element 28 has a first surface 28a, a second surface 28b and a third surface 28c. The first surface 28a is orthogonal or perpendicular to the second and third surfaces 28b, 28c. The second surface 28b is arranged opposite the third surface 28c. A second pivot bearing 29 is positioned at the second end 25b of the first arm element 25.

The second latching element 28 is configured such that it can be accommodated in the second angular recess of the base element 6 by the first and second surfaces 28a, 28b. Since the first latching element 26 and the second latching element 28 are identical in configuration, the second latching element 28 also has a height H.

The connecting piece 30 connects the first arm element 24 to the second arm element 25, as a result of which the first and second arm elements 24, 25 are arranged parallel to each other in their longitudinal extent. A stop element 31 is positioned in the middle of the connecting piece 30.

The locking device 18 is shown by itself in FIGS. 15 through 19 and primarily comprises a first locking element 33, a second locking element 34 and a middle piece 35. The first locking element 33 contains a first contact element 33a, a first surface 33b and a second surface 33c. The first contact element 33a is orthogonal or perpendicular to the first surface 33b and arranged opposite the second surface 33c. As is shown in FIG. 19, the second surface 33c is formed in an acute angle α to the horizontal Z.

The second locking element 34 contains a second contact element 34a, a first surface 34b and a second surface 34c. The second contact element 34a is orthogonal or perpendicular to the first surface 34b and arranged opposite the second surface 34c. Both the first locking element 33 and the second locking element 34 contain a guiding assembly 36, 37 by which the locking device 18 in the adapter apparatus 8 or in the adapter housing 15 is guided in direction B and counter to direction B. FIGS. 15, 16, 17, 18, 22 and 25 show the respective guiding assembly 36, 37 in the form of a tongue-and-groove system.

The middle piece 35 connects the first locking element 33 to the second locking element 34, and so the first and second locking elements 33, 34 are arranged parallel to each other. Furthermore, the middle piece 35 contains a counter-stop element 38 in its center.

As is shown in FIGS. 7, 8, 20 and 22 and as has already been mentioned above, the latching device 17 and the locking device 18 are arranged in the cavity 23 of the adapter apparatus 8 or adapter housing 15.

FIGS. 20, 21 and 22 show a perspective view through the adapter apparatus 8, wherein the latching device 17 is positioned above the locking device 18 in direction B. The latching device 17 is thus arranged such that the first and second pivot bearings 27, 29 are oriented toward the second side wall 15c. The first and second latching elements 26, 28 point in direction B with their respective first surfaces 26a, 28a and second surfaces 26b, 28b. The stop element 31 arranged in the center of the connecting piece 30 points opposite direction B.

The locking device 18 is arranged such that the first surface 33b of the first locking element 33 and the first surface 34b of the second locking element 34 point in direction A. The second surface 33c of the first locking element 33 and the second surface 34c of the second locking element 34 point opposite direction B. The first contact element of the first locking element 33 and the second contact element of the second locking element 34 point in direction B, wherein said first contact element 33a is oriented toward the first arm element 24 and said second contact element 34a is oriented toward the second arm element 25. The counter-stop element 38 of the middle piece 35 is oriented in direction B, and so the counter-stop element 38 is positioned in direction B below the stop element 31 of the connecting piece 30.

A compression spring element 40 is disposed between the stop element 31 of the connecting piece 30 and the counter-stop element 38 of the middle piece 35. The spring force of the compression spring element 40 retains the stop element 31 at a particular distance from the counter-stop element 38.

The latching device 17 can be reversibly adjusted between a first position and a second position. In FIGS. 7, 8, 20, 21, 22, 23, 25 and 26, the latching device 17 is in the first position. In FIG. 24, the latching device 17 is in the second position. For the latching device 17 to move from the first position to the second position, the latching device 17 is pivoted around the first and second pivot bearings 27, 29 and about the pivot axis R in pivot direction N. In order for the latching device 17 to move back from the second position to the first position, the latching device 17 is pivoted around the first and second pivot bearings 27, 29 and about the pivot axis R in pivot direction N' (cf. FIG. 24).

In the first position, the first and second surfaces 26a, 26b of the first latching element 26 extend through the first opening 22a of the adapter cover 16 and fit in the first angular recess 7a of the base element 6. Moreover, the first and second surfaces 28a, 28b of the second latching element 28 extend though the second opening 22b of the adapter cover 16 and fit in the second angular recess of the base element 6. Furthermore, the first latching element 26 rests against the first guiding track 21a and the second latching element 28 rests against the second guiding track 21b. The latching device 17 is retained in the first position by the spring force of a torsion spring 42. The torsion spring 42 is disposed between the first and second pivot bearings 27, 29 for this purpose. The latching device 17 can be moved from the first position to the second position against the spring force of the torsion spring 42. When the latching device 17 is in the second position, the first latching element 26 is located below the first opening 22a of the adapter cover 16 facing opposite direction B, and the second latching element 28 is located below the second opening 22b of the adapter cover 16 facing opposite direction B (cf. FIG. 24).

The locking device 18 can be adjusted between a first position and a second position. In FIGS. 7, 8, 20 and 22, the locking device 18 is in the first position. In FIGS. 22, 25 and 26, the locking device 18 is in the second position. In the first position, the first contact element 33a of the first locking element 33 rests against the first arm element 24 of the latching device 17. Nevertheless, the second contact element 34a of the second locking element 34 rests against the second arm element 25 of the latching device 17. The compression spring element 40 between the latching device 17 and the locking device 18 is thereby compressed.

In order to move the locking device 18 from the first position to the second position, the locking device 18 is displaced counter to direction B. The spring force of the compression spring element 40 presses the locking device 18 from the first position to the second position.

When the locking device 18 is in the first position, the first and second contact elements 33a, 34a of the locking device 18 accordingly press against the first and second arm elements 24, 25 of the latching device 17 in order to retain the latching device 17 in the first position. By contrast, when the locking device 18 is in the second position, the first and second contact elements 33a, 34a of the locking device 18 no longer press against the first and second arm elements 24, 25 of the latching device 17, and so the latching device 17 can be moved from the first position to the second position. However, the latching device 17 is retained in the first position owing to the spring force of the torsion spring 42. In the second position, the second surface 33c of the first locking element 33 extends through the opening 19a of the adapter housing 15, and the second surface 34c of the second locking element 34 extends through the second opening 19b of the adapter housing 15 (cf. FIGS. 25, 26).

When the rechargeable battery 9 is connected to the adapter apparatus 8, as is shown in FIGS. 1, 7 and 8, the locking device 18 is in the first position. This is also because the upper side 10c of the battery housing 10 presses against the second surface 33c of the first locking element 33 and against the second surface 34c of the second locking element 34 when the rechargeable battery 9 is displaced in direction A toward the lower side wall of the adapter housing 15 and the rechargeable battery is connected to the lower side wall of the adapter housing 15 as a result. The movement of the rechargeable battery counter to direction A thus causes a movement of the locking device in direction B from the second position to the first position. For this reason, owing to the specific arrangement and configuration of the first surface, the second surface and the guiding assembly, the locking device is caused to move in or counter to direction B when the rechargeable battery is correspondingly moved in or counter to direction A.

When the rechargeable battery 9 is pulled from the base 15a of the adapter housing 15 in direction A, as is shown in FIGS. 2, 25 and 26, the upper side 10c of the battery housing 10 no longer presses against the second surface 33c of the first locking element 33 and the second surface 34c of the locking element 34 in the locking device 18. The locking device 18 is moved from the first position to the second position by the spring force of the compression spring element 40 between the latching device 17 and the locking device 18. An interval X is established between the latching device 17 and the locking device 18 (cf. FIGS. 22, 25, 26). The latching device 17 is thus no longer pushed in direction A by locking device 18 when the locking device 18 is in the second position. Only the spring force of the torsion spring 42 pushes on the latching device 17 and causes it to remain in the first position. Depending upon the spring force of the torsion spring 42, the latching device 17 can already be pivoted around the pivot axis R by a particular amount in pivot direction N and may no longer be entirely in the first position (i.e. the first and second surfaces 33c, 34c of the locking element 33, 34 fit entirely into the recesses 7a of the base element 6) when the locking device 18 is no longer in the first position.

As has already been mentioned above, the latching device 17 can be pivoted about the pivot axis R in pivot direction N from the first position to the second position. However, the latching device 17 is moved from the first position to the second position only if the adapter apparatus 8 is pulled from the base element 6 in direction A. The relative movement of the adapter apparatus 8 toward the base element 6 causes the first locking element 33 to be pressed out of the first angular recess 7a of the base element 6 and the second locking element 34 to be pressed out of the second angular recess of the base element 6. This is possible, since the latching device 17 can pivot about the pivot axis R in pivot direction N and, as a result, the two locking elements 33, 34 can pivot out of the corresponding recesses 7a (cf. FIG. 24).

When the rechargeable battery 9 is removed from the adapter apparatus 8, the locking device 18 no longer locks the latching device 17 in the first position, and so the adapter apparatus 8 can be pulled from the base element 6 of the power tool 1 against the spring force of the torsion spring 42. However, if the rechargeable battery 9 is connected to the adapter apparatus 8, the locking device 18 locks the latching device 17 in the first position, and so the adapter apparatus 8 cannot be pulled from the base element 6 of the power tool 1. It is thereby possible to prevent the unintended removal and withdrawal of the adapter apparatus 8 from the base element 6 when only the battery 9 is supposed to be removed from the power tool 1.

The invention claimed is:

1. An adapter apparatus for connecting a rechargeable battery to a power tool, the adapter apparatus containing
    a latching device for latching the adapter apparatus to the power tool; and
    a locking device for locking the latching device,
    wherein the latching device can be reversibly adjusted from a first position to a second position, wherein, in the first position, the adapter apparatus is attached to a power tool and, in the second position, the adapter apparatus can be removed from the power tool, and in that the locking device can be reversibly adjusted from a first position to a second position, wherein, in the first position, the locking device locks the latching device in its first position and, in the second position, the locking device does not lock the latching device, and the latching device can be moved from the first position to the second position; and,
    wherein the latching device has a height (H) and comprises at least one latching element, and the adapter apparatus further comprises a compression spring element having a spring force, wherein an interval (X) is established between the latching device and the locking device by the spring force of the compression spring element when there is no rechargeable battery connected to the adapter apparatus, wherein the interval (X) corresponds at least to the height (H) of the latching element.

2. The adapter apparatus according to claim 1, wherein the latching device is retained in the first position by the spring force of the compression spring element.

3. The adapter apparatus according to claim 2, wherein the latching device is configured such that the latching device shifts from the first position to the second position against the spring force of the compression spring element when the adapter apparatus is moved relative to the power tool.

4. The adapter apparatus according to claim 3, wherein the latching device is a snap-fit connection.

5. The adapter apparatus according to claim 1, wherein the latching device is configured such that the latching device shifts from the first position to the second position against the spring force of the compression spring element when the adapter apparatus is moved relative to the power tool.

6. The adapter apparatus according to claim 5, wherein the latching device is a snap-fit connection.

7. The adapter apparatus according to claim 1, wherein the latching device is a snap-fit connection.

8. An adapter apparatus for connecting a rechargeable battery to a power tool, the adapter apparatus containing
    a latching device for latching the adapter apparatus to the power tool; and
    a locking device for locking the latching device,
    wherein the latching device can be reversibly adjusted from a first position to a second position, wherein, in the first position, the adapter apparatus is attached to a power tool and, in the second position, the adapter apparatus can be removed from the power tool, and in that the locking device can be reversibly adjusted from a first position to a second position, wherein, in the first position, the locking device locks the latching device in its first position and, in the second position, the locking device does not lock the latching device, and the latching device can be moved from the first position to the second position;
    wherein the locking device can be moved from the second position to the first position by connecting a rechargeable battery to the adapter apparatus; and,
    wherein the latching device has a height (H) and comprises at least one latching element, and the adapter apparatus further comprises a compression spring element having a spring force, wherein an interval (X) is established between the latching device and the locking device by the spring force of the compression spring element when there is no rechargeable battery connected to the adapter apparatus, wherein the interval (X) corresponds at least to the height (H) of the latching element.

9. The adapter apparatus according to claim 8, wherein the latching device is retained in the first position by the spring force of the compression spring element.

10. The adapter apparatus according to claim 9, wherein the latching device is configured such that the latching device shifts from the first position to the second position against the spring force of the compression spring element when the adapter apparatus is moved relative to the power tool.

11. The adapter apparatus according to claim 10, wherein the latching device is a snap-fit connection.

12. The adapter apparatus according to claim 9, wherein the latching device is a snap-fit connection.

13. The adapter apparatus according to claim 8, wherein the latching device is a snap-fit connection.

* * * * *